United States Patent
Hiraoka et al.

(10) Patent No.: US 8,303,448 B2
(45) Date of Patent: Nov. 6, 2012

(54) SPEED CHANGE TRANSMISSION APPARATUS

(75) Inventors: Minoru Hiraoka, Osakasayama (JP); Yoshirou Takao, Sakai (JP); Masaru Andou, Kawachinagano (JP)

(73) Assignee: Kubota Corporation, Osaka (JP)

( * ) Notice: Subject to any disclaimer, the term of this patent is extended or adjusted under 35 U.S.C. 154(b) by 525 days.

(21) Appl. No.: 12/297,245

(22) PCT Filed: Sep. 25, 2007

(86) PCT No.: PCT/JP2007/068533
§ 371 (c)(1),
(2), (4) Date: Jan. 7, 2009

(87) PCT Pub. No.: WO2008/096473
PCT Pub. Date: Aug. 14, 2008

(65) Prior Publication Data
US 2009/0280944 A1 Nov. 12, 2009

(30) Foreign Application Priority Data

Feb. 5, 2007 (JP) .................................. 2007-025737
Feb. 15, 2007 (JP) .................................. 2007-035011

(51) Int. Cl.
*F16H 47/04* (2006.01)
(52) U.S. Cl. ......................................... 475/83; 475/207
(58) Field of Classification Search ............... 475/5, 72, 475/73, 75, 76, 78, 80, 83, 207–209
See application file for complete search history.

(56) References Cited

U.S. PATENT DOCUMENTS

| 5,159,855 | A | * | 11/1992 | Nikolaus et al. ................ 475/78 |
| 5,466,197 | A | | 11/1995 | Mitsuya et al. |
| 7,166,049 | B2 | * | 1/2007 | Saller ............................... 475/5 |
| 7,331,894 | B2 | * | 2/2008 | Sowul et al. ................... 475/138 |
| 7,465,245 | B2 | * | 12/2008 | Ripamonti et al. ............ 475/83 |
| 7,887,449 | B2 | * | 2/2011 | Katayama et al. ............. 475/82 |
| 8,096,912 | B2 | * | 1/2012 | Hiraoka et al. .............. 475/208 |
| 2003/0162618 | A1 | | 8/2003 | Hasegawa et al. |
| 2005/0059521 | A1 | * | 3/2005 | Funato et al. ................... 475/73 |
| 2008/0214351 | A1 | | 9/2008 | Katayama et al. |
| 2009/0082151 | A1 | * | 3/2009 | Tabata et al. ...................... 475/5 |
| 2009/0149292 | A1 | | 6/2009 | Hiraoka et al. |
| 2009/0156345 | A1 | * | 6/2009 | Ishimori et al. ............... 475/116 |

FOREIGN PATENT DOCUMENTS

| EP | 1930198 | 6/2008 |
| JP | 20010164630 A | 6/1989 |
| JP | 04203652 | 7/1992 |
| JP | 5187526 | 7/1993 |
| JP | 2714879 | 11/1997 |
| JP | 3176677 | 4/2001 |
| JP | 2001108060 | 4/2001 |

(Continued)

*Primary Examiner* — Justin Holmes
*Assistant Examiner* — Huan Le
(74) *Attorney, Agent, or Firm* — The Webb Law Firm

(57) ABSTRACT

Disclosed is an apparatus including a stepless speed change device receiving an engine drive; a planetary transmission device for, by a plurality of planetary transmission mechanisms, combining an output from the stepless speed change device and the engine drive not subject to a speed change by the stepless speed change device; and a speed range setting device for outputting the drive combined by the planetary transmission device and divided into a plurality of speed ranges. The planetary transmission device, the speed range setting device and a forward-reverse changeover device are located forwardly of a rear end of an upstream transmission case portion. An electric motor may be used instead of the stepless speed change device.

5 Claims, 14 Drawing Sheets

FOREIGN PATENT DOCUMENTS

| | | |
|---|---|---|
| JP | 20030276461 A1 | 9/2003 |
| JP | 200411714 A | 1/2004 |
| JP | 2004011714 A * | 1/2004 |
| JP | 2004069028 | 3/2004 |
| JP | 200792949 | 4/2007 |
| JP | 2007091139 | 4/2007 |
| WO | 9209830 A1 | 6/1992 |
| WO | 2007040077 A1 | 12/2007 |

* cited by examiner

|  |  | Clutches (C) | | Auxiliary speed change device (K) | |
|---|---|---|---|---|---|
|  |  | 1st clutch C1 | 2nd clutch C2 | Low speed clutch CL | High speed clutch CH |
| Low speed mode | 1st speed range | engaged | — | engaged | — |
|  | 2nd speed range | — | engaged | engaged | — |
| High speed mode | 1st speed range | engaged | — | — | engaged |
|  | 2nd speed range | — | engaged | — | engaged |

Fig.16

|  |  | 1st clutch C1 | 2nd clutch C2 | Low speed clutch CL | High speed clutch CH |
|---|---|---|---|---|---|
| Low speed mode | 1st speed range | engaged | — | engaged | — |
|  | 2nd speed range | — | engaged | engaged | — |
| High speed mode | 1st speed range | engaged | — | — | engaged |
|  | 2nd speed range | — | engaged | — | engaged |

SPEED CHANGE TRANSMISSION APPARATUS

BACKGROUND OF THE INVENTION

1. Field of the Invention

The present invention relates to a speed change transmission apparatus, and more particularly to a speed change transmission apparatus including a planetary transmission device for, by a plurality of planetary transmission mechanisms, combining an output from a stepless speed change device and the engine drive not subject to a speed change by the stepless speed change device, or combining an output from an electric motor and the engine drive.

2. Description of Related Art

When the above speed change transmission apparatus includes a stepless speed change device, the speed of the stepless speed change device is changed and the speed range setting device is duly switched in conjunction with the change in speed, so that the drive outputted from the engine and stepless speed change device and combined is divided into a plurality of speed ranges and is outputted steplessly at each of the speed ranges. When the above speed change transmission apparatus includes an electric motor, on the other hand, the speed of the electric motor is changed and the speed range setting device is duly switched in conjunction with the change in speed, so that the drive outputted from the engine and electric motor and combined is divided into a plurality of speed ranges and is outputted steplessly at each of the speed ranges.

This type of speed change transmission apparatus was previously developed and disclosed in JP 2007-091139 A. The structure disclosed in JP 2007-091139 A will be described hereunder, but the purpose is to compare the structure disclosed in JP 2007-091139 A and the structure in the present application in order to describe the present application, not necessarily to acknowledge the structure disclosed in JP 2007-091139 A as prior art. FIG. 13 is a line drawing of a travel transmission apparatus for a tractor mounting the previously developed speed change transmission apparatus. As illustrated, the previously developed speed change transmission apparatus includes a stepless speed change device 20, a planetary transmission device P, a speed range setting device C, an auxiliary speed change device K and forward-reverse changeover device B.

The planetary transmission device P includes a first planetary transmission mechanism P1, a second planetary transmission mechanism P2 and a third planetary transmission mechanism P3. The first planetary transmission mechanism P1 includes a ring gear receiving the engine drive not subject to the speed changing action of the stepless speed change device 20, and a sun gear receiving the output from the stepless speed change device 20. The second planetary transmission mechanism P2 includes a carrier interlocked with the ring gear of the first planetary transmission mechanism P1, and a ring gear interlocked with the carrier of the first planetary transmission mechanism P1. The third planetary transmission mechanism P3 includes a sun gear interlocked with the sun gear of the second planetary transmission mechanism P2, and a carrier interlocked with the ring gear of the second planetary transmission mechanism P2. The speed range setting device C includes a first clutch C1 and a second clutch C2. The forward-reverse changeover device B includes a forward clutch CF and a reverse clutch CR.

In FIG. 13, numeral 3 denotes a rear wheel differential mechanism, and numeral 7 denotes a front wheel differential mechanism.

FIG. 15 illustrates a relationship between speed change states of the stepless speed change device 20, speed ranges and output speeds of the output shaft 80 (referred to hereinafter as output speed) in the previously developed speed change transmission apparatus. In FIG. 15, "−MAX" indicates the speed change state of the maximum speed when the stepless speed change device 20 is in the speed change area on the reverse rotational output side, "0" indicates when the stepless speed change device 20 is in neutral, and "+MAX" indicates the speed change state of the maximum speed when the stepless speed change device 20 is in the speed change area on the forward rotational output side.

FIG. 16 is a diagram showing a relationship between the speed ranges and clutching states in the previously developed speed change transmission apparatus. In FIG. 16, "engaged" indicates that the clutches C1, C2, CL and CH are engaged, while "−" indicates that the clutches C1, C2, CL and CH are not engaged.

FIG. 14 is a block diagram of the speed change apparatus of the previously developed speed change transmission apparatus. This speed change apparatus includes a speed change lever 100, a speed change mode selection device 102 and a control device 105. The control device 105 switches the first clutch C1 and second clutch C2 and changes the speed of the stepless speed change device 20 based on the data detected by a speed change command detection device 101 connected to the speed change lever 100. The control device 105 switches the low speed clutch CL and high speed clutch CH based on commands from the speed change mode selecting device 102.

As illustrated, the previously developed speed change transmission apparatus is as follows.

That is, when the first clutch C1 of the speed range setting device C is engaged and the second clutch C2 is not engaged while the low speed clutch CL of the auxiliary speed change device K is engaged, and the stepless speed change device 20 is changed from "−MAX" to "+MAX" in that state, the output shaft 80 is operated in the first speed range in low speed mode, and the output speed accelerates steplessly from "0". Changing the stepless speed change device 20 to "+MAX" results in an output speed "Vlm." When the first clutch C1 is then switched to a disengaged state and the second clutch C2 is switched to an engaged state, and the stepless speed change device 20 is changed from "+MAX" to "−MAX" in this state, the output shaft 80 is driven at the second speed range in low speed mode, and the output speed accelerates steplessly from "Vlm". Changing the stepless speed change device 20 to "−MAX" results in an output speed of "Vlh."

When the high speed clutch CH of the auxiliary speed change device K is engaged and the second clutch C2 is disengaged while the first clutch C1 of the speed range setting device C is in an engaged sate, and the stepless speed change device 20 is changed from "−MAX" to "+MAX" in that state, the output shaft 80 is driven at the first speed range in high speed mode, and the output speed accelerates from "0" steplessly. Changing the stepless speed change device 20 to "+MAX" results in an output speed of "Vhm." When the first clutch C1 is then disengaged and the second clutch C2 is engaged, and the stepless speed change device 20 is changed from "+MAX" to "−MAX" in this state, the output shaft 80 is driven at the second speed range in high speed mode, and the output speed accelerates from "Vhm" steplessly. Changing the stepless speed change device 20 to "−MAX" results in an output speed of "Vhh."

When the previously developed speed change transmission apparatus is mounted on a traveling device of a tractor, the output from the speed range setting device C can undergo auxiliary speed changes and be transmitted to the output shaft 80 acting as an output rotator, so as to allow the traveling device to be driven and speed-changed steplessly at high torque while working, and to allow the traveling device to be driven at continuously variable speed at high speed when moving. The output from the speed range setting device C can also be converted to forward drive and reverse drive and be transmitted to the output shaft 80, making it possible to travel by easily switching between forward and reverse movement.

The previously developed speed change transmission apparatus tends to be economically disadvantageous in attempting to diversify tractor design to meet demand.

That is, in addition to demand requiring the ability to switch between low and high speed modes, there is also demand with no such need for switching between low and high speed modes. Tractor models, whichever they do and do not allow switching between low and high speed modes, include forward-reverse changeover devices. Diversification on the basis of the previously developed speed change transmission apparatus results in manufacturing models in which some has an output side of the speed range setting device C and an input side of the forward-reverse changeover device B interlocked by means of the auxiliary speed change device K and some interlocked not means of the auxiliary speed change device K.

SUMMARY OF THE INVENTION

An object of the present invention is to provide a speed change transmission apparatus which is more advantageous to diversification of tractors while providing a traveling device suitable for tractors.

The above object is fulfilled according to a first aspect of the present invention as follows.

A speed change transmission apparatus comprising:
an electric motor or a stepless speed change device for receiving an engine drive;
a planetary transmission device for, by a plurality of planetary transmission mechanisms, combining an output from the stepless speed change device and the engine drive not subject to a speed change by the stepless speed change device, or combining an output from the electric motor and the engine drive;
a speed range setting device for receiving the drive combined by the planetary transmission device and producing a first speed range and a second speed range, the speed range setting device including a first clutch and a second clutch;
a forward-reverse changeover device for switching a direction of the output from the speed range setting device;
an upstream transmission case portion, the upstream transmission case portion having a rear end; and
a downstream transmission case portion housing at least a rear wheel differential mechanism, the downstream transmission case portion having a front end to be directly or indirectly connected with the rear end of the upstream transmission case portion;
wherein the planetary transmission device, the speed range setting device and forward-reverse changeover device are disposed coaxial with one another and forwardly of the rear end of the upstream transmission case portion.

According to this aspect, outputs from the engine and stepless speed change device, or outputs from the engine and electric motor are combined by the planetary transmission device, and the combined drive is outputted via the speed range setting device and forward-reverse changeover device.

According to the structure in the first aspect of the invention, when an auxiliary speed change device is provided, the auxiliary speed change device can be provided in a transmission case separate from the upstream transmission case portion. As such, parts forwardly of the rear end of the upstream transmission case portion of the speed change transmission apparatus can be used whether or not an auxiliary speed change device is provided.

It is thus possible to provide a speed change transmission apparatus that can be used for different types of transmissions, yet can still provide a traveling device suitable for a tractor which can be driven steplessly at high torque while working, which can be driven steplessly at high speed when moving, and which can be furthermore switched between forward and reverse traveling simply by switching a forward-reverse changeover device.

According to a second aspect of the invention, an auxiliary speed change device is housed in the downstream transmission case portion for receiving an output from the forward-reverse changeover device. Providing the auxiliary speed change device makes it possible to produce a model, for example, capable of switching between a plurality of speed modes such as high speed mode and low speed mode.

According to a third aspect of the invention:
the first and second clutches of the speed range setting device are hydraulic clutches,
the forward-reverse changeover device includes a hydraulic clutch, and a rotating member each of the hydraulic clutches of the speed range setting device and a rotating member of the hydraulic clutch of the forward-reverse changeover device are mounted on a same pivot shaft.

Whereby, an operating oil channel for operating the hydraulic clutches for setting the speed range and an operating oil channel for operating the hydraulic clutch for setting the transmission rotation direction are provided inside the pivot shaft, allowing the speed range setting device and the forward-reverse changeover device to be operated.

Therefore, the hydraulic circuits for operating the speed range setting device and the forward-reverse changeover device can be made in a compact form in which both the operating oil channels for the speed range setting device and the operating oil channel for the forward-reverse changeover device are provided in the same pivot shaft, allowing the speed change transmission apparatus to be made more compact.

According to a fourth aspect of the invention,
the first and second clutches of the speed range setting device are meshing clutches, the speed range setting device further including a shift member shared by the first and second clutches, and
the shift member has a position thereof in mesh with both the first and second clutched disposed between a position thereof in mesh with only one of the first and second clutches and a position thereof in mesh with only the other of the first and second clutches.

According to the structure of the fourth aspect, halfway of switching the speed range setting device between one speed range setting and the other speed range setting, the shift member comes meshed with both of the meshing clutches, while preventing blocked transmission occurring when the shift member goes out of mesh with both of the meshing clutches.

A speed range setting device beneficial in terms of structure and cost can therefore be provided through the adoption of meshing clutches, yet no blocked transmission will occur during the speed range settings are switched, allowing the speed to be smoothly changed with fewer speed change shocks caused by blocked transmission.

Incidentally, in this type of speed change transmission apparatus, the weight of the planetary transmission mechanisms tends to be significant, and when the planetary transmission device rotates at high speed, the weight inertia of the planetary transmission device tends to be significant. Slip thus tends to be produced at a portion or portions of the speed change transmission apparatus in which a friction clutch is employed. That is, there tends to be significant transmission loss. The previously developed speed change transmission apparatus therefore inputs the engine drive via a speed-reducing mechanism 115 to the ring gear of the first planetary transmission mechanism P1, as illustrated in FIG. 13, to reduce the speed of the planetary transmission device. The speed-reducing mechanism 115 includes a gear 115a interlocked with the pump shaft 21 of the stepless speed change device 20 and a gear 115b meshed with the gear 115b.

The previously developed speed change transmission apparatus tends to be heavier and larger in terms of the mechanism for the input of the engine drive to the planetary transmission device.

According to a fifth aspect of the invention, the speed change transmission apparatus further comprises:
- an output rotator for outputting drive after the speed change by the speed change transmission apparatus;
- a manually operable speed change member;
- a speed change command detection sensor for detecting a speed change command from the speed change member; and
- a controller for changing speed of the electric motor or the stepless speed change device and switching the speed range setting device based on data detected by the speed change command detection sensor so that the output rotator is driven in a speed range and at a rotating speed according to the speed change command from the speed change member,
- wherein the controller is constructed in such a way that:
  - when the speed range setting device is operated to drive the output rotator at the first speed range, the speed of the electric motor or the stepless speed change device is changed along the entire speed change area on the reverse rotation output side thereof and along the entire speed change area on the forward rotation output side thereof; and
  - when the speed range setting device is operated to drive the output rotator at the second speed range, the speed of the electric motor or the stepless speed change device is changed along the entire speed change area on the forward rotation output side thereof and along a lower side speed change area on the reverse rotation output side thereof excluding a higher side speed change area on the reverse rotation output side thereof.

According to this aspect, the engine drive is inputted in a non-reduced speed state to the planetary transmission device or, even when the drive must be inputted in a reduced speed state, the reduced speed ratio can be lower, so that the maximum rpm produced in the planetary transmission device can be kept comparatively low.

It is thus possible to minimize transmission loss with a lower maximum planetary transmission device rpm, yet the speed of the mechanism for inputting engine drive to the planetary transmission device does not need to be reduced or a lower speed reduction ratio can be set.

According to a sixth aspect of the invention, the planetary transmission device receives the engine drive in a non-reduced speed state. Then, there is no need to reduce the engine drive input to the planetary transmission device.

BRIEF DESCRIPTION OF THE DRAWINGS

FIG. 16 is a diagram showing a relationship between a clutching state, a speed range and a speed mode in the previously developed speed change transmission apparatus.

DETAILED DESCRIPTION OF THE INVENTION

Embodiments of the invention will be described hereinafter with reference to the accompanying drawings. Although several embodiments will be described, it is to be understood that combinations of feature(s) from one embodiment and feature(s) from another embodiment(s) are also within the scope of the invention.

Figure 1:
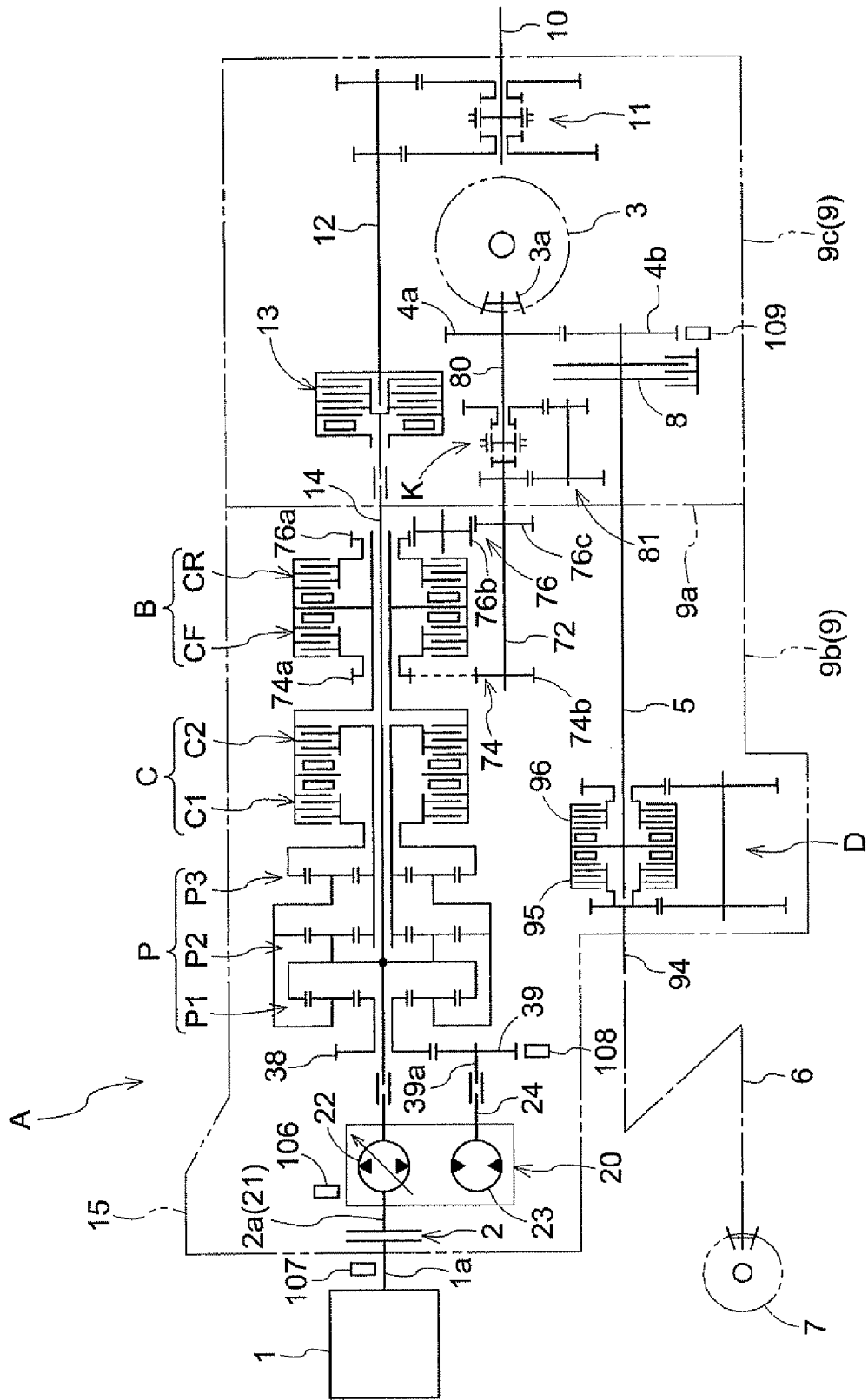
FIG. 1 is a line drawing of a tractor's travel transmission apparatus provided with a speed change transmission apparatus according to a first embodiment.

FIG. 1 is a line drawing of a tractor's travel transmission apparatus provided with a speed change transmission apparatus A according to a first embodiment. As illustrated, the travel transmission apparatus includes a main clutch 2 receiving an output from an output shaft 1a of an engine 1; the speed change transmission apparatus A having an input shaft 21 connected to an output shaft 2a of the main clutch 2; a rear wheel differential mechanism 3 having an input gear 3a connected to an output shaft 80 acting as an output rotator of the speed change transmission apparatus A; a front wheel speed change device D receiving the drive of the output shaft 80 via transmission gears 4a, 4b and a transmission shaft 5; a front wheel differential mechanism 7 receiving the drive from an output shaft 94 of the front wheel speed change device D via a transmission shaft 6; and a brake disk 8 provided on the transmission shaft 5 adjacent the transmission gear 4b. The output shaft 2a of the main clutch and the input shaft 21 of the speed change transmission apparatus A constitute the same shaft.

As illustrated in FIG. 1, a power takeoff shaft 10 provided at a rear position of the transmission case 9 transmits the drive from the engine 1 to various implements such as a rotary tiller (not shown) connected to a rear position of the tractor chassis. This power takeoff shaft 10 is interlocked with an input shaft 21 via an implement speed change device 11, a transmission shaft 12, an operating clutch 13 and a transmission shaft 14.

As illustrated in FIG. 1, the speed change transmission apparatus A in the first embodiment includes the input shaft 21 and the output shaft 80, as well as a stepless speed change device 20 having the input shaft 21; a planetary transmission device P located behind the stepless speed change device 20; a speed range setting device C located behind the planetary transmission device P; a forward-reverse changeover device B located behind the speed range setting device C; and an auxiliary speed change device K located downstream of the forward-reverse changeover device B in a drive transmitting direction, so that the drive outputted from the forward-reverse changeover device B may be transmitted thereto.

The stepless speed change device 20 is located inside the clutch housing 15. The clutch housing 15 is connected in front of the transmission case 9 to extend continuous with. The planetary transmission device P, the speed range setting device C, the forward-reverse changeover device B and the auxiliary speed change device K are located inside the transmission case 9.

Figure 2:
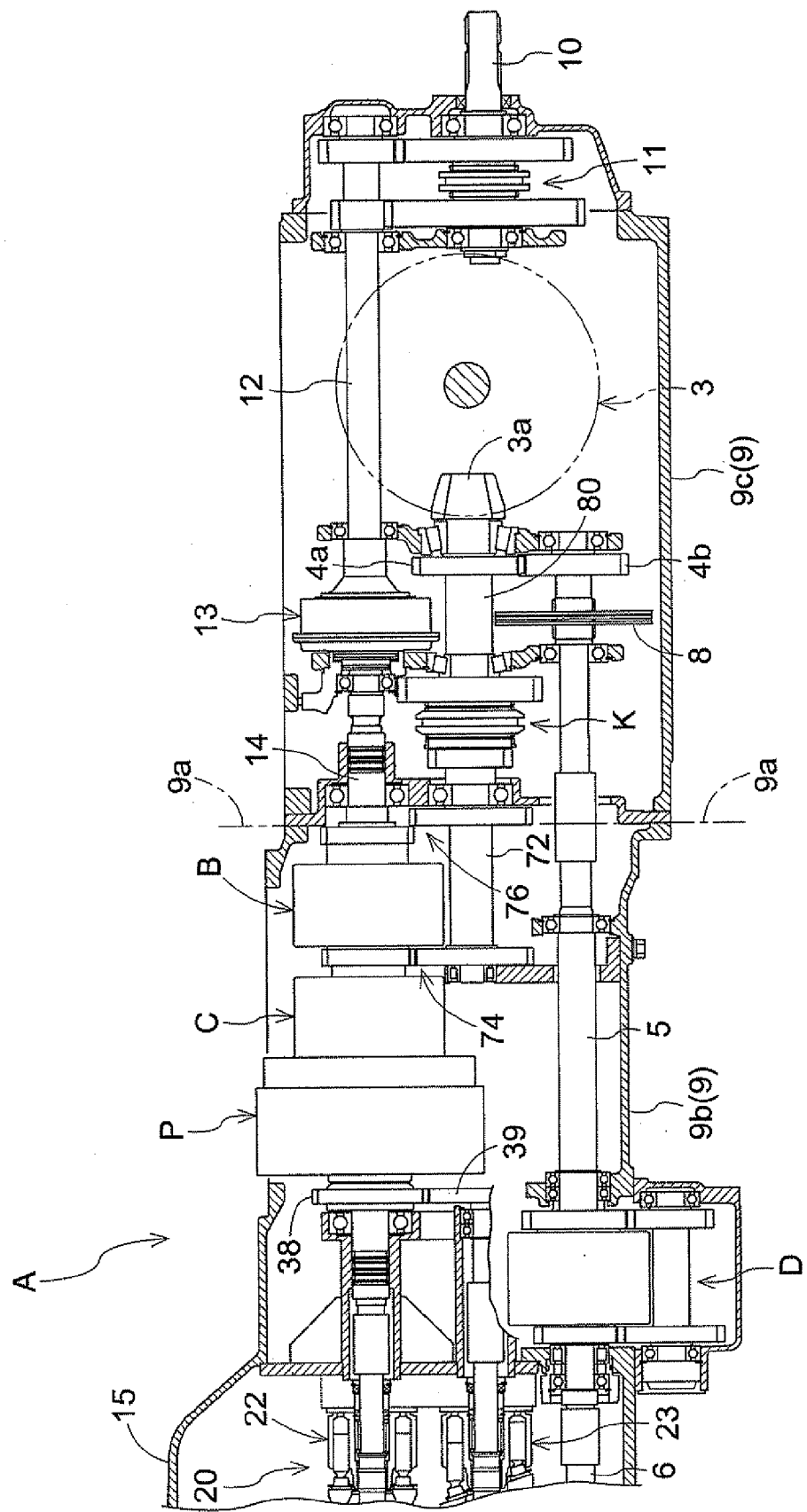
FIG. 2 is a cross sectional view of a transmission case.

As illustrated in FIG. 2, the transmission case 9 includes a transmission case dividing line 9a at an intermediate position thereof in a fore and aft direction of the chassis, which line 9a divides the transmission case 9 into an upstream transmission case portion 9b and a downstream transmission case portion 9c. That is, the dividing line 9a indicates a rear end of the upstream transmission case portion 9b. The upstream transmission case portion 9b houses the planetary transmission device P, the speed range setting device C, the forward-reverse changeover device B and the front wheel speed change transmission apparatus D. The downstream transmission case portion 9c houses the auxiliary speed change device K, the rear wheel differential mechanism 3 and the brake disk 8.

The stepless speed change device 20 includes an axial plunger variable displacement type hydraulic pump 22 having its input shaft 21 serving as a pump shaft (the input shaft 21 will be referred to as the pump shaft 21 below) and an axial plunger type hydraulic motor 23 driven by the pressure oil from the hydraulic pump 22. The stepless speed change device 20 comprises a hydrostatic transmission.

In specific, the stepless speed change device 20 changes a swash plate angle of the hydraulic pump 22 to switch the stepless speed change device 20 between forward, neutral and reverse transmission states. When switched to the forward transmission state, the stepless speed change device 20 changes the swash plate angle of the hydraulic pump 22 so that the drive from the engine 1 is switched to drive in the forward rotating direction and change speed of the drive steplessly to be outputted through the motor shaft 24. When switched to the reverse transmission state, the stepless speed change device 20 changes the swash plate angle of the hydraulic pump 22 so that the drive from the engine 1 is switched to drive in the reverse rotating direction and change speed of the drive steplessly to be outputted through the motor shaft 24. When the stepless speed change device 20 is switched to neutral, outputting the drive from the motor shaft 24 is stopped.

Figure 3:
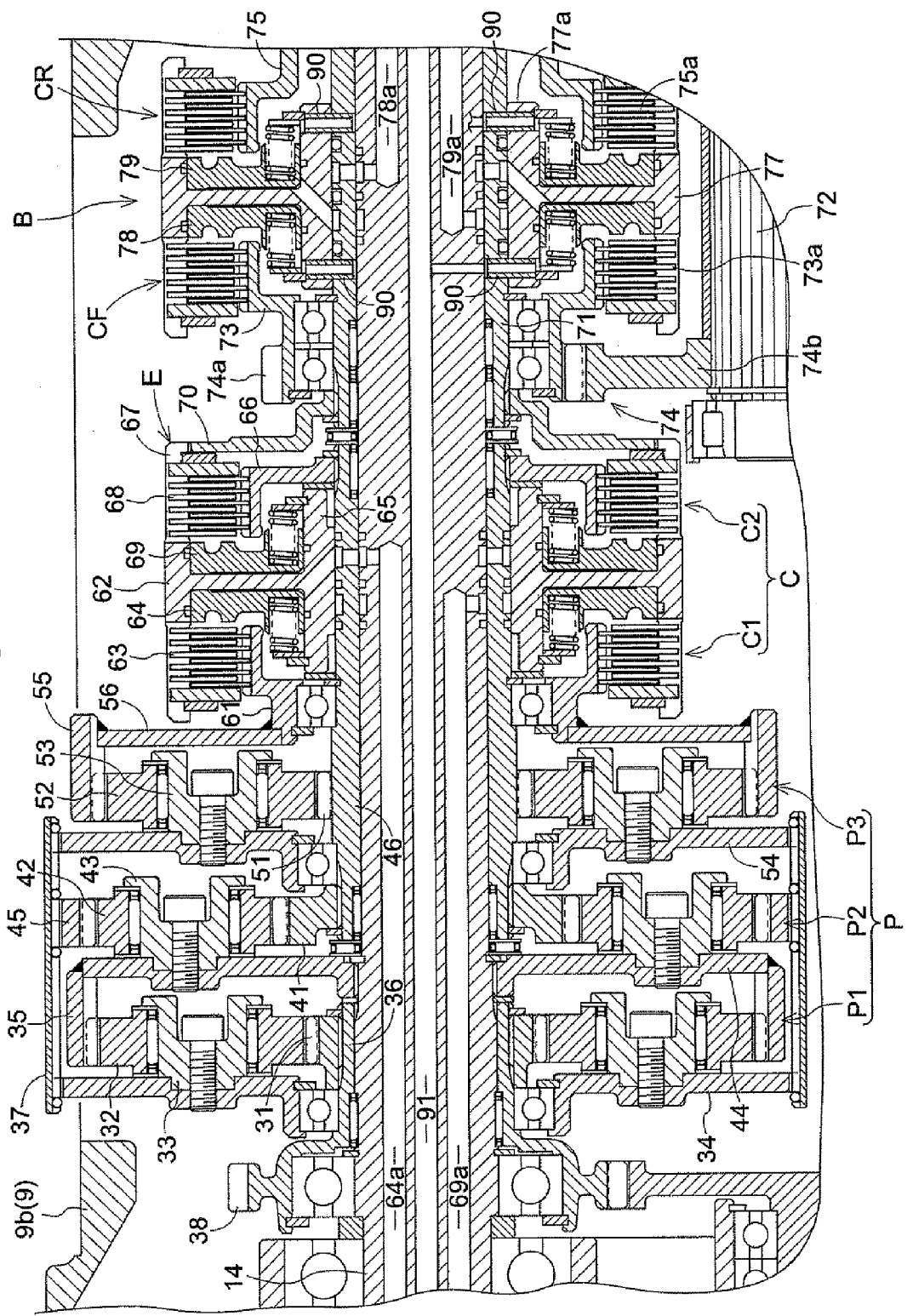
FIG. 3 is a cross sectional view of a planetary transmission device and a speed range setting device.

FIG. 3 is a cross sectional view of the planetary transmission device P. As illustrated in this drawing and in FIG. 1, the planetary transmission device P includes a first planetary transmission mechanism P1, a second planetary transmission mechanism P2 and a third planetary transmission mechanism P3 arranged in the fore and aft direction of the chassis between the stepless speed change device 20 and speed range setting device C.

Each of the planetary transmission mechanisms P1, P2, P3 includes a sun gear 31, 41, 51 located in concentric with the transmission shaft 14; a plurality of satellite gears 32, 42, 52 distributed around the sun gear 31, 41, 51 and meshing with the sun gear 31, 41, 51; a carrier 34, 44, 54 rotatably supporting the satellite gears 32, 42, 52 via support a shaft member 33, 43, 53; and a ring gear 35, 45, 55 meshing with the satellite gears 32, 42, 52 at its inner gear. The carrier 34 of the first planetary transmission mechanism P1 is relatively rotatably supported via a bearing by a cylinder shaft 36 relatively rotatably fitted onto the transmission shaft 14. The sun gear 31 of the first planetary transmission mechanism P1 is supported by the cylinder shaft 36.

The sun gear 31 and cylinder shaft 36 are splined with each other to be rotatable in unison. The carrier 44 of the second planetary transmission mechanism P2 is supported by the transmission shaft 14. The carrier 44 and transmission shaft 14 are integrally and rotatably coupled by engagement with a spline. The sun gear 41 of the second planetary transmission mechanism P2 is supported by cylinder shaft 46 fitted onto the transmission shaft 14. The sun gear 41 and cylinder shaft 46 are splined with each other to be rotatable in unison. The carrier 54 of the third planetary transmission mechanism P3 is relatively rotatably supported by the cylinder shaft 46 by way of a bearing. The sun gear 51 of the third planetary transmission mechanism P3 is integrally formed with the cylinder shaft 46 and rotates in unison with the cylinder shaft 46. The ring gear 35 of the first planetary transmission mechanism P1 and the carrier 44 of the second planetary transmission mechanism P2 are integrally and rotatably coupled by welding one end of the ring gear 35 with an outer periphery of the carrier 44. The carrier 34 of the first planetary transmission mechanism P1, the ring gear 45 of the second planetary transmission mechanism P2 and the carrier 54 of the third planetary transmission mechanism P3 are integrally and rotatably coupled by a cylindrical interlocking member 37 splined to outer peripheries of the two carriers 34 and 54 and of the ring gear 45. The ring gear 55 of the third planetary transmission mechanism P3 is integrally and rotatably coupled with an input side member 61 of the speed range setting device C by means of a disk-shaped interlocking member 56 coupled on the outer peripheral side with one end of the ring gear 55. The cylindrical shaft 36 is interlocked with the motor shaft 24 by means of a transmission gear 38 formed at one end thereof, a transmission gear 39 meshed with the transmission gear 38 and a rotating bearing 39a integrally and rotatably supported by the transmission gear 39.

That is, at the planetary transmission device P, the drive transmitted from the output shaft 1a of the engine 1 through the main clutch 2 to the front end of the pump shaft 21 and outputted from the rear end of the pump shaft 21 is inputted through the transmission shaft 14 to the carrier 44 of the second planetary transmission mechanism P2 and to the ring gear 35 of the first planetary transmission mechanism P1. In this way, the planetary transmission device P inputs the drive to the carrier 44 of the second planetary transmission mechanism P2 and the ring gear 35 of the first planetary transmission mechanism P1, while the speed of the engine drive outputted from the output shaft 1a of the engine 1 is not being changed by the stepless speed change device 20 and is not being reduced. The planetary transmission device P inputs the output from the motor shaft 24 of the stepless speed change device 20 to the sun gear 31 of the first planetary transmission mechanism P1 via the rotating bearing 39a, transmission gear 39, transmission gear 38 and cylinder shaft 36. The planetary transmission device P combines the engine drive thus inputted and the drive from the stepless speed change device 20 by means of the three planetary transmission mechanisms P1, P2 and P3, and outputs the combined drive to the cylinder shaft 46 and interlocking member 56 to be transmitted to the speed range setting device C.

FIG. 3 shows a cross section of the speed range setting device C. As illustrated in this drawing and FIG. 1, the speed range setting device C includes a first clutch C1 and second clutch C2 arranged around and along the cylinder shaft 46.

The first clutch C1 includes a cylindrical input side member 61, a cylindrical output side member 62 located on an outer periphery of the input side member 61, a multi-disk type friction clutch body 63 provided between the output side member 62 and input side member 61, and a hydraulic piston 64 slidably provided inside the output side member 62. The input side member 61 is relatively rotatably supported by the cylinder shaft 46 by way of a bearing. The input side member 61 is integrally and rotatably coupled with the interlocking member 56. The output side member 62 is relatively rotatably mounted on the cylinder shaft 46 by way of an attachment member 65 connected in the interior thereof.

The hydraulic piston 64 is slid by supply/discharge of hydraulic pressure in an operating oil channel 64a provided inside the transmission shaft 14. When the friction clutch body 63 is operated under pressure by the hydraulic piston 64, the first clutch C1 is engaged to transmit the drive of the input side member 61 driven by means of the ring gear 55 via the interlocking member 56 via the friction clutch body 63 to the output side member 62. When the pressure on the friction clutch body 63 by the hydraulic piston 64 is released, the first clutch C1 is disengaged to block transmission from the input side member 61 to the output side member 62.

The second clutch C2 has a cylindrical input side member 66, a cylindrical output side member 67 located on an outer periphery of the input side member 66, a multi-disk type friction clutch body 68 provided between the output side member 67 and input side member 66, and a hydraulic piston 69 slidably provided inside the output side member 67. The input side member 66 is integrally rotatably splined with the cylinder shaft 46.

The hydraulic piston 69 is slid by supply and discharge of hydraulic pressure in an operating oil channel 69a provided inside the transmission shaft 14. When the friction clutch body 68 is operated under pressure by the hydraulic piston 69, the second clutch C2 is engaged to transmit the drive of the input side member 66 driven by means of the sun gears 41 and 51 via the cylinder shaft 46 via the friction clutch body 68 to the output side member 67. When the pressure on the friction clutch body 68 by the hydraulic piston 69 is released, the second clutch C2 is disengaged to block transmission from the input side member 66 to the output side member 67.

The output side member 62 of the first clutch C1 and the output side member 67 of the second clutch C2 are integrally formed. The output side member 67 of the second clutch C2 is integrally and rotatably interlocked with the input cylinder shaft 71 of the forward-reverse changeover device B by way of a round interlocking member 70. In this way, the output side member 62 of the first clutch C1 and the output side member 67 of the second clutch C2 are relatively rotatably supported by the transmission shaft 14 acting as a pivot shaft by way of the attachment member 65 and the cylinder shaft 46 relatively rotatably mounting the attachment member 65. The output side member 62 of the first clutch C1 and the output side member 67 of the second clutch C2 are integrally and rotatably interlocked with the transmission cylinder shaft 71 by way of the interlocking member 70. The input cylinder shaft 71 of the forward-reverse changeover device B is relatively rotatably mounted on the transmission shaft 14. The interlocking member 70 and output side member 67 are integrally, rotatable and detachably coupled by means of engagement type coupling device E having a recess defined on one side of the interlocking device 70 and an output side member 67, and a protrusion defined on the other side. That is, the input cylinder shaft 71 of the forward-reverse changeover device B assembled with the interlocking member 70 is fitted on the transmission shaft 14 from behind, and the interlocking member 70 is integrally and rotatably coupled with the output side member 67 of the second clutch C2 in conjunction with assembly of the forward-reverse changeover device B with the transmission shaft 14.

Figure 4:
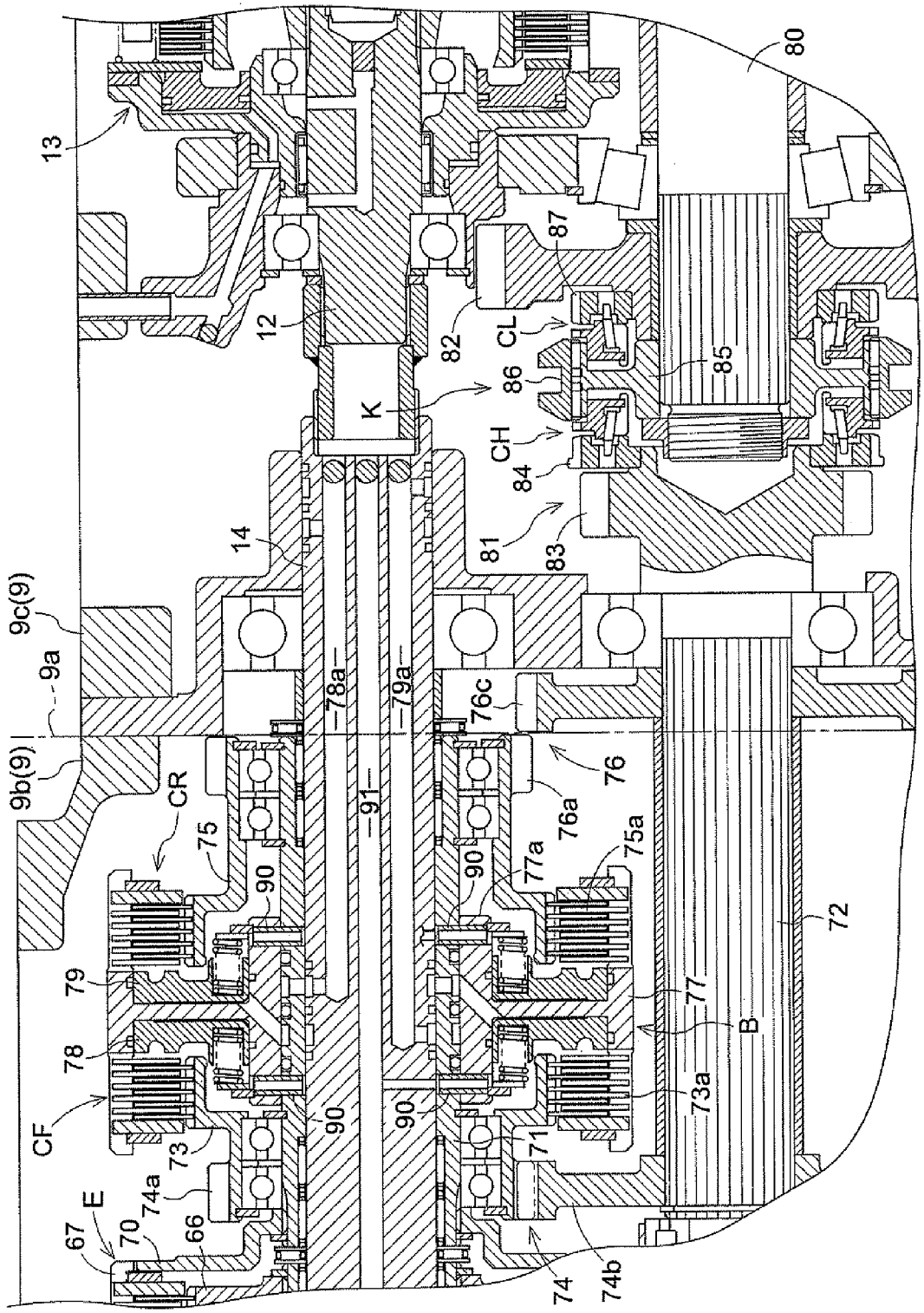
FIG. 4 is a cross sectional view of a forward-reverse changeover device and an auxiliary speed change device.

FIG. 4 shows a cross section of the auxiliary speed change device K. As illustrated in this drawing and FIG. 1, the auxiliary speed change device K has the output shaft 80, as well as a low speed transmission gear mechanism 81 provided between the rear end of the output shaft 72 of the forward-reverse changeover device B and the front end of the output shaft 80; a high speed clutch CH provided between the rear end of the output shaft 72 and the front end of the output shaft 80; and a low speed clutch CL provided between the front end of the output shaft 80 and a transmission gear 82 of the low speed transmission gear mechanism 81.

The high speed clutch CH includes a high speed gear 84 integrally and rotatably provided on one side of a transmission gear 83 of the low speed transmission gear mechanism 81, and a shift gear 86 integrally, rotatably and slidably provided at one end of the output shaft 80 by way of a gear support 85. The transmission gear 83 is integrally formed with the output shaft 72. Thus, the transmission gear 83 is integrally rotatable in unison with the output shaft 72.

The low speed clutch CL includes a low speed gear 87 integrally and rotatably provided on the side of the transmission gear 82, and the shift gear 86. The transmission gear 82 is relatively rotatably supported by the output shaft 80. Thus, the low speed gear 87 is rotatable relative to the output shaft 80.

The shift gear 86 is slid along the gear support 85 to be switched between a high speed position meshed with the gear support 85 and the high speed gear 84, and a low speed position meshed with the gear support 85 and the low speed gear 87. When the shift gear 86 is switched to the high speed position, the high speed clutch CH is engaged to allow the drive of the high speed gear 84 to reach the output shaft 80 by way of the shift gear 86 and gear support 85. This results in a high speed of the auxiliary speed change device K, which allows the drive from the output shaft 72 of the forward-reverse changeover device B to reach the front end of the output shaft 80 by way of the high speed clutch CH, and to be transmitted from the rear end of the output shaft 80 to the rear wheel differential mechanism 3 and the front wheel speed change device D. When the shift gear 86 is disengaged from the high speed gear 84, the high speed clutch CH is disengaged, which blocks the transmission from the high speed gear 84 to the output shaft 80.

When the shift gear 86 is switched to the low speed position, the low speed clutch CL is engaged, which allows the drive of the low speed gear 87 to reach the output shaft 80 by way of the shift gear 86 and gear support 85. This results in a low speed of the auxiliary speed change device K, which allows the drive from the output shaft 72 of the forward-reverse changeover device B to reach the front end of the output shaft 80 by way of the low speed transmission gear mechanism 81 and the low speed clutch CL and to be outputted from the rear end of the output shaft 80 to the rear wheel differential mechanism 3 and the front wheel speed change device D. When the shift gear 86 is disengaged from the low speed gear 87, the low speed clutch CL is disengaged, blocking the transmission from the low speed gear 87 to the output shaft 80.

Figures 5, 6:
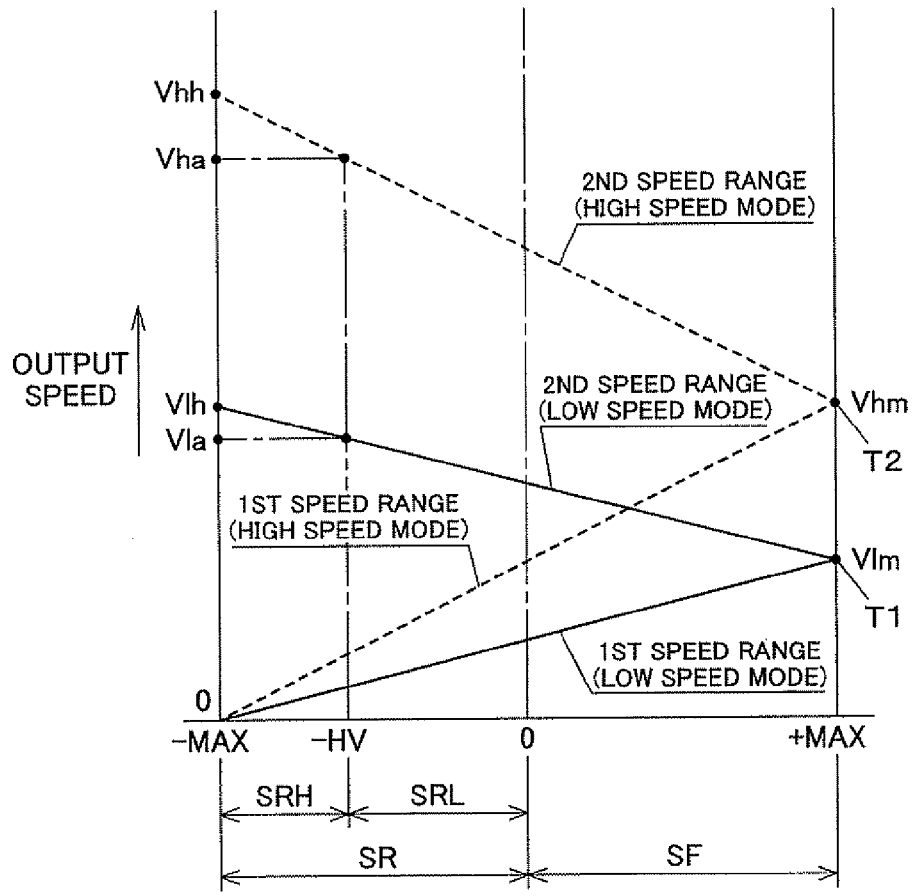
FIG. 5 is a diagram showing a relationship between a speed mode, a speed range and a clutching state.
FIG. 6 is a diagram showing a relationship between a speed change state of a stepless speed change device, a speed range, a speed mode and an output speed.

FIG. 5 is a diagram showing a relationship between operating states of the clutches C1, C2, CL, and CH, a speed range set by the speed range setting device C, and a speed mode set by the auxiliary speed change device K. In FIG. 5, "engaged" indicates engagement of clutches C1, C2, CL and CH, while the "−" indicates disengagement of clutches C1, C2, CL and CH. FIG. 6 is a diagram showing a relationship between a speed change state of the stepless speed change device 20, a speed range set by the speed range setting device C, a speed mode set by the auxiliary speed change device K and a drive speed of the output shaft 80 (referred to below as an output speed). A horizontal axis in FIG. 6 represents the speed change state of the stepless speed change device 20 and a vertical axis in FIG. 6 represents the output speed. "−MAX" on the horizontal axis indicates the speed change state of the maximum speed when the stepless speed change device 20 is in the reverse transmission state, "0" indicates when the stepless speed change device 20 is in neutral, and "+MAX" indicates the speed change state of the maximum speed when the stepless speed change device 20 is in the forward transmission state.

As illustrated, the speed range setting device C establishes the speed range in such a way that the clutches C1 and C2 are duly switched to allow the combined drive from the planetary transmission device P to be transmitted to the output shaft 80 by way of the forward-reverse changeover device B and auxiliary speed change device K, the speed range being divided into the two stages of a first speed range and a second speed range.

As illustrated in FIGS. 4 and 5, when the low speed clutch CL is engaged and the high speed clutch CH is disengaged, the auxiliary speed change device K is switched to low speed mode in which the drive outputted from the output shaft 72 of the forward-reverse changeover device B is transmitted to the front end of the output shaft 80 via the low speed transmission mechanism 81 and low speed clutch CL, and from the rear end of the output shaft 80 to the rear wheel differential mechanism 3 and front wheel differential mechanism 7. When the low speed clutch CL is disengaged and the high speed clutch CH is engaged, the auxiliary speed change device K is switched to high speed mode in which the drive outputted from the output shaft 72 of the forward-reverse changeover device B is transmitted through the high speed clutch CH to the front end of the output shaft 80 and from the rear end of the output shaft 80 to the rear wheel differential mechanism 3 and front wheel differential mechanism 7.

That is, when the first clutch C1 and low speed clutch CL are engaged, and the second clutch C2 and high speed clutch CH are disengaged, the speed range setting device C and auxiliary speed change device K set the first speed range in low speed mode so that the output speed accelerates from "0" steplessly as the speed of the stepless speed change device 20 is changed from "−MAX" to "+MAX, and the output speed is "Vlm" when the stepless speed change device 20 reaches "+MAX."

When the second clutch C2 and low speed clutch CL are engaged and the first clutch C1 and high speed clutch CH are disengaged, the speed range setting device C and auxiliary speed change device K set the second speed range in low speed mode so that the output speed accelerates from "Vlm" steplessly as the speed of the stepless speed change device 20 is changed from "+MAX" to "−MAX", and the output speed is "Vlh" when the stepless speed change device 20 reaches "−MAX"." When the second speed range in low speed mode is set in this manner by the speed range setting device C and auxiliary speed change device K, the output speed is "Vla" when the stepless speed change device 20 is operated at "−HV."

When the first clutch C1 and high speed clutch CH are engaged, and the second clutch C2 and low speed clutch CL are disengaged, the speed range setting device C and auxiliary speed change device K set the first speed range in high speed mode so that the output speed accelerates from "0" steplessly as the speed of the stepless speed change device 20 is changed from "−MAX" to "+MAX, and the output speed is "Vhm" when the stepless speed change device 20 reaches "+MAX."

When the second clutch C2 and high speed clutch CH are engaged and the first clutch C1 and low speed clutch CL are disengaged, the speed range setting device C and auxiliary speed change device K set the second speed range in high speed mode so that the output speed accelerates from "Vhm" steplessly as the speed of the stepless speed change device 20 is changed from "+MAX" to "−MAX", and the output speed is "Vhh" when the stepless speed change device 20 reaches "−MAX"." When the second speed range in high speed mode is set in this manner by the speed range setting device C and auxiliary speed change device K, the output speed is "Vha" when the stepless speed change device 20 is operated at "−HV."

FIG. 4 show a cross section of the forward-reverse changeover device B. As illustrated in this drawing and FIG. 1, the forward-reverse changeover device B includes the input cylinder shaft 71 and output shaft 72, as well as a forward clutch CF and a reverse clutch CR provided on the input cylinder shaft 71 in the fore and aft direction of the chassis; a forward transmission gear mechanism 74 between the forward clutch CF output side member 73 and output shaft 72, and a reverse transmission gear mechanism 76 between the output side member 75 of the reverse clutch CR and output shaft 72. The forward transmission gear mechanism 74 includes a gear 74a integrally and rotatably provided on the output side member 73 and a gear 74b meshing with the gear 74a. The gear 74b is integrally and rotatably connected to the output shaft 72. The reverse transmission gear mechanism 76 includes a gear 76a integrally and rotatably provided on the output side member 75, a reverse relay gear 76b meshed with the gear 76a and a gear 76c meshed with the relay gear 76b. The gear 76c is integrally and rotatably connected to the output shaft 72.

The forward clutch CF and reverse clutch CR include multi-disk friction clutch main bodies 73a, 75a provided between the input side member 77 and output side members 73, 75; and hydraulic pistons 78, 79 slidably provided inside the input side member 77.

That is, the forward clutch CF and reverse clutch CR are engaged so that, when the hydraulic pistons 78, 79 are slid by supply and discharge of the operating hydraulic pressure produced by the operating oil channels 78a and 79a inside the transmission shaft 14 and the hydraulic pistons 78, 79 apply pressure to the friction clutch main bodies 73a, 75a, the drive of the input side member 77 driven by the input cylinder shaft 71 will be transmitted through the friction clutch main bodies 73a, 75a to the output side members 73, 75. The forward clutch CF and reverse clutch CR are disengaged so as to block transmission from the input side member 77 to the output side members 73, 75 when the pressure by the hydraulic pistons 78, 79 on the friction clutch bodies 73a, 75a is released.

The input side member 77 is integrally formed with the forward clutch CR and reverse clutch CR. The input side member 77 is integrally and rotatably connected to the input cylinder shaft 71 via an attachment member 77a connected in the interior thereof and via a plurality of connecting pins 90 mounted along the attachment member 77a and input cylinder shaft 71. The connection pins 90 are hollow pins having through holes open on both sides thereof, and drain oil channels for communicating interiors of the forward clutch CF and reverse clutch CR with a discharge oil channel 91 inside the transmission shaft 14 are formed by the through holes.

That is, when the forward clutch CF is engaged and the reverse clutch CR is disengaged, the forward-reverse changeover device B is in the forward transmission state, wherein the drive of the input cylinder shaft 71 is transmitted through the forward clutch CF and forward transmission gear mechanism 74 to the output shaft 72 and is outputted from the output shaft 72 to the auxiliary speed change device K. When the forward clutch CF is disengaged and the reverse clutch CR is engaged, the forward-reverse changeover device B is in the reverse transmission state, wherein the drive of the input cylinder shaft 71 is transmitted through the reverse clutch CR and reverse transmission gear mechanism 76 to the output shaft 72 and is outputted from the output shaft 72 to the auxiliary speed change device K.

The front wheel speed change device D is switched between a constant speed transmission state and an accelerating transmission state by a constant speed clutch 95 and an accelerating clutch 96. When switched to the constant speed state, the front wheel speed change device D transmits drive to the front wheel differential mechanism 7 so that the mean circumferential speed of the pair of right/left front wheels is equivalent to the mean circumferential speed of the pair of right/left rear wheels. When switched to the accelerating transmission state, the front wheel speed change device D transmits drive to the front wheel differential mechanism 7 so that the mean circumferential speed of the pair of right/left front wheels is about two times faster than the mean circumferential speed of the pair of right/left rear wheels.

Figure 7:
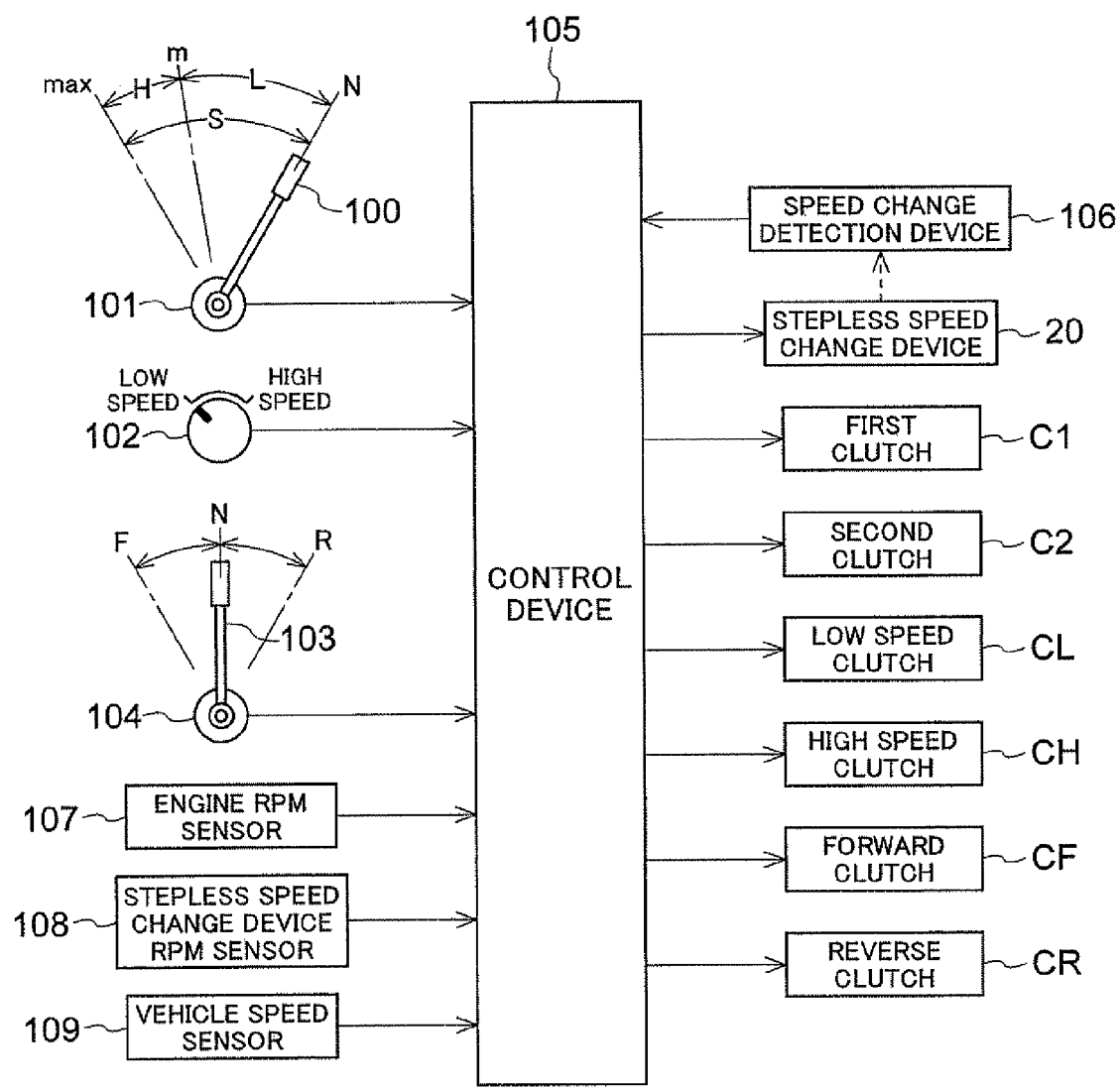
FIG. 7 is a block diagram of a speed change apparatus.

FIG. 7 is a block diagram of the speed change apparatus of a travel transmission apparatus. As illustrated, the speed change apparatus includes a speed change lever 100, a speed change command detection device 101 mounted on the speed. change lever 100, a speed change mode selection device 102, a forward-reverse lever 103, a forward-reverse detection device 104 mounted on the forward-reverse lever 103, and a controller (control device) 105 linked to the speed change command detection device 101, speed change mode selection device 102 and forward-reverse detection device 104. The speed change lever 100, speed change mode selection device 102 and forward-reverse lever 103 are provided in the tractor operator's section. The controller 105 is linked to the stepless speed change device 20 by way of the speed change actuator (not shown) for operating speed change components of the stepless speed change device 20. The controller 105 is linked to the first clutch C1, second clutch C2, forward clutch CF and reverse clutch CR by way of separate clutch valves (not shown) for operating the first clutch C1, second clutch C2, forward clutch CF and reverse clutch CR. The controller 105 is linked to the low speed clutch CL and high speed clutch CH by way of an actuator (not shown) for shifting the shift gear 86 for the low speed clutch CL and high speed clutch CH. A speed change detection device 106, an engine rpm sensor 107, a stepless speed change device rpm sensor 108 and a vehicle speed sensor 109 are linked to the controller 105.

The speed change lever 100 oscillates within an operating region S from a neutral position N to a maximum speed position max. Within the operating range S, a portion from the neutral position N to an intermediate position m is a low speed operating region L, and a portion from the intermediate position m to the maximum speed position max is a high speed operating range H.

The speed change mode selection device 102 is composed of a switch switchable between the low speed position and high speed position. When the speed change mode selection device 102 is switched to the low speed position, a low speed mode command is outputted to the controller 105, and when the speed change mode selection device 102 is switched to the high speed position, a high speed mode command is outputted to the controller 105.

The speed change command detection device (speed change command detection sensor) 101 includes a rotating potentiometer interlocked with the speed change lever 100. The speed change command detection device 101 senses operating positions of the speed change lever 100 as speed change commands, and outputs the sensed results to the controller 105. Other than the above rotating potentiometer, a well-known device may be used such as a switch for the speed change command detection device (speed change command detection sensor).

The speed change detection device 106 includes a rotating potentiometer linked to the speed change apparatus of the stepless speed change device 20. The speed change detection device 106 senses the speed change state of the stepless speed change device 20 and feeds back the sensed results to the controller 105. The stepless speed change device rpm sensor 108 senses an output rpm from the motor shaft 24 of the stepless speed change device 20 and outputs the result to the controller 105. The vehicle speed sensor 109 senses the rpm of the output shaft 80 as the vehicle speed and outputs the results to the controller 105.

The forward-reverse lever 103 is switchable between a forward position F, a neutral position N and a reverse position R. The forward-reverse detection device 104 includes a rotating potentiometer interlocked with the forward-reverse lever 103. The forward-reverse detection device 104 senses an operating position of the forward-reverse lever 103 and outputs the result to the controller 105.

The controller 105 includes a hardware necessary to implement the functions described in the present specification such as a microcomputer, a memory and a communication device, and a software with encoded algorithms. When the speed change mode selection device 102 is set to the low speed position, the controller 105 is set to a low speed mode based on the low speed mode command from the speed change mode selection device 102. When the speed change lever 100 is in the low speed operating range L in a low speed mode, the controller 105 disengages the second clutch C2 and high speed clutch CH while the first clutch C1 and low speed clutch CL are engaged based on the sensed data from the speed change command detection device 101, and changes the speed of the stepless speed change device 20 from "−MAX" to "+MAX" based on the sensed data from the speed change command detection device 101 and speed change detection device 106 as the speed change lever 100 is shifted from the neutral position N to the intermediate position m. At this time, based on the sensed data from the speed change command detection device 101 and speed change detection device 106, the controller 105 changes the speed of the stepless speed change device 20 along the entire speed change area SR in the reverse transmission state (see FIG. 6, referred to below as reverse rotation speed change area SR) and the entire speed change area SF in the forward transmission state (see FIG. 6, referred to below as forward rotation speed change area SF), and when the speed change lever 100 is in the intermediate position m, the stepless speed change device 20 is shifted to "+MAX."

When the speed change lever 100 is in the high speed operating range H in low speed mode, the controller 105 disengages the first clutch C1 and high speed clutch CH while the second clutch C2 and low speed clutch CL are engaged based on the sensed data from the speed change command detection device 101, and changes the speed of the stepless speed change device 20 from "+MAX" to "−VH" based on the sensed data from the speed change command detection device 101 and speed change detection device 106 as the speed change lever 100 is shifted from the intermediate position m to the maximum speed position max. At this time, based on the sensed data from the speed change command detection device 101 and speed change detection device 106, the controller 105 changes the speed of the stepless speed change device 20 over the entire forward rotation speed change area SF and a low speed portion SRL of the entire rearward rotation speed change region SRL excluding a high speed portion SRH of the speed change area SR. When the speed change lever 100 reaches the maximum speed position max, the stepless speed change device 20 is shifted to "−VH". That is, even though the speed change lever 100 is in the maximum speed position max, the stepless speed change device 20 is not shifted to "−MAX", but stays in the "−VH" speed change state which is lower than "−MAX."

When the speed change mode selection device 102 is shifted to the high speed position, the controller 105 is set to high speed mode based on the high speed mode command from the speed change mode selection device 102. When the speed change lever 100 is in the low speed operating range L, the controller 105 in high speed mode disengages the second clutch C2 and low speed clutch CL while the first clutch C1 and high speed clutch CH are engaged based on the sensed data from the speed change command detection device 101, and changes the speed of the stepless speed change device 20 from "−MAX" to "+MAX" based on the sensed data from the speed change command detection device 101 and speed change detection device 106 as the speed change lever 100 is shifted from the neutral position N to the intermediate position m. At this time, based on the sensed data from the speed change command detection device 101 and speed change detection device 106, the controller 105 changes the speed of the stepless speed change device 20 along the entire reverse rotation speed change area SR and the entire forward rotation speed change area SF, and when the speed change lever 100 is in the intermediate position m, the stepless speed change device 20 is shifted to "+MAX."

When the speed change lever 100 is in the high speed operating range H, the controller 105 in high speed mode disengages the first clutch C1 and low speed clutch CL while the second clutch C2 and high speed clutch CH are engaged based on the sensed data from the speed change command detection device 101, and changes the speed of the stepless speed change device 20 from "+MAX" to "−VH" based on the sensed data from the speed change command detection device 101 and speed change detection device 106 as the speed change lever 100 is shifted from the intermediate position m to the maximum speed position max. At this time, based on the sensed data from the speed change command detection device 101 and speed change detection device 106, the controller 105 changes the speed of the stepless speed change device 20 along the entire speed change area SF on the forward rotation side and the entire speed change region SRL on the low speed side as part of the speed change area SR on the reverse rotation side, and when the speed change lever 100 is in the maximum speed position max, the stepless speed change device 20 is shifted to "−VH". That is, even though the speed change lever 100 is in the maximum speed position max, the stepless speed change device 20 is not shifted to "−MAX", but stays in the "−VH" speed change state which is lower than "−MAX".

The controller 105 senses points T1 and T2 (see FIG. 6) whereat the first speed range is switched to the second speed range or vice versa, based on the sensed data from the stepless speed change device rpm sensor 108, vehicle speed sensor 109 and engine rpm sensor 107.

In other words, when driving the tractor, the operator operates the speed change mode selection device 102 to select the speed change mode, and when the speed change lever 100 is operated in that state, the tractor travels at a vehicle speed corresponding to the selected speed change mode and the operating position of the speed change lever 100.

That is, the speed change mode selection device 102 is set to the low speed position, and the speed change lever 100 is moved from the neutral position N to the intermediate position m. The controller 105 then engages the first clutch C1 and low speed clutch CL based on the mode setting data from the speed change mode selection device 102 and the sensed data from the speed change command detection device 101. As a result, the speed range setting device C and auxiliary speed change device K divide the combined drive from the planetary transmission device P in stages into the first speed range in low speed mode for outputting the drive from the output shaft 80. Furthermore, based on the sensed data from the speed change command detection device 101, the controller 105 changes the speed of the stepless speed change device 20 into continuously variable speed from "−MAX" to "+MAX". As a result, the output speed in terms of the vehicle speed accelerates steplessly from "0" to "V1m". When the speed change lever 100 is set to the intermediate position m, the controller 105 changes the speed of the stepless speed change device 20 to "+MAX," resulting in an output speed of "V1m."

With the speed change mode selection device 102 thus set to the low speed position, the speed change lever 100 is moved from the intermediate position m to the maximum speed position max. Based on the mode setting data from the speed change mode selection device 102 and the sensed data from the speed change command detection device 101, the controller 105 then engages the second clutch C2 and low speed clutch CL. As a result, the speed range setting device C and auxiliary speed change device K divide the combined drive from the planetary transmission device P in stages into the second speed range in low speed mode for outputting the drive from the output shaft 80. Furthermore, based on the sensed data from the speed change command detection device 101, the controller 105 changes the speed of the stepless speed change device 20 from "+MAX" to "−VH", and the output speed in terms of the vehicle speed accelerates steplessly from "Vlm" to "Vla." When the speed change lever 100 is set to the maximum speed position max, the controller 105 changes the speed of the stepless speed change device 20 to "−VH" resulting in an output speed of "Vla".

With the speed change mode selection device 102 set to the maximum speed position, the speed change lever 100 is moved from the neutral position N to the middle speed position m. Based on the mode setting data from the speed change mode selection device 102 and the sensed data from the speed change command detection device 101, the controller 105 then engages the first clutch C1 and high speed clutch CH. As a result, the speed range setting device C and auxiliary speed change device K divide the combined drive from the planetary transmission device P in stages into the first speed range in high speed mode for outputting the drive from the output shaft 80. Furthermore, based on the sensed data from the speed change command detection device 101, the controller 105 changes the speed of the stepless speed change device 20 from "−MAX" to "+MAX". The output speed in terms of the vehicle speed thus accelerates steplessly from "0" to "Vhm". When the speed change lever 100 is set to the intermediate position m, the controller 105 changes the speed of the stepless speed change device 20 to "+MAX" resulting in an output speed of "Vhm."

With the speed change mode selection device 102 thus set to the high speed position, the speed change lever 100 is moved from the intermediate position m to the maximum speed position max. Based on the mode setting data from the speed change mode selection device 102 and the sensed data from the speed change command detection. device 101, the controller 105 then engages the second clutch C2 and high speed clutch CH. As a result, the speed range setting device C and auxiliary speed change device K divide the combined drive from the planetary transmission device P in stages into the second speed range in high speed mode for outputting the drive from the output shaft 80. Furthermore, based on the sensed data from the speed change command detection device 101, the controller 105 changes the speed of the stepless speed change device 20 from "+MAX" to "−VH", and the output speed in terms of the vehicle speed accelerates steplessly from "Vhm" to "Vha". When the speed change lever 100 is set to the maximum speed position max, the controller 105 changes the speed of the stepless speed change device 20 to "−VH", resulting in an output speed of "Vha".

When the forward-reverse lever 103 is set to the forward side as a tractor travels in this manner, the controller 105 engages the forward clutch CF based on the sensed data from the forward-reverse detection device 104. The forward-reverse changeover device B is thus set to the forward transmission state, and the tractor travels forward.

When the forward-reverse lever 103 is set to the reverse side, the controller 105 engages the reverse clutch CR based on the sensed data from the forward-reverse detection device 104. The forward-reverse changeover device B is thus set to the reverse transmission state, and the tractor travels in reverse.

When the forward-reverse lever 103 is set to the neutral position N, the controller 105 disengages the forward clutch CF and reverse clutch CR based on the sensed data from the forward-reverse detection device 104. The forward-reverse changeover device B is thus set to neutral, and the tractor stops.

Figure 8:
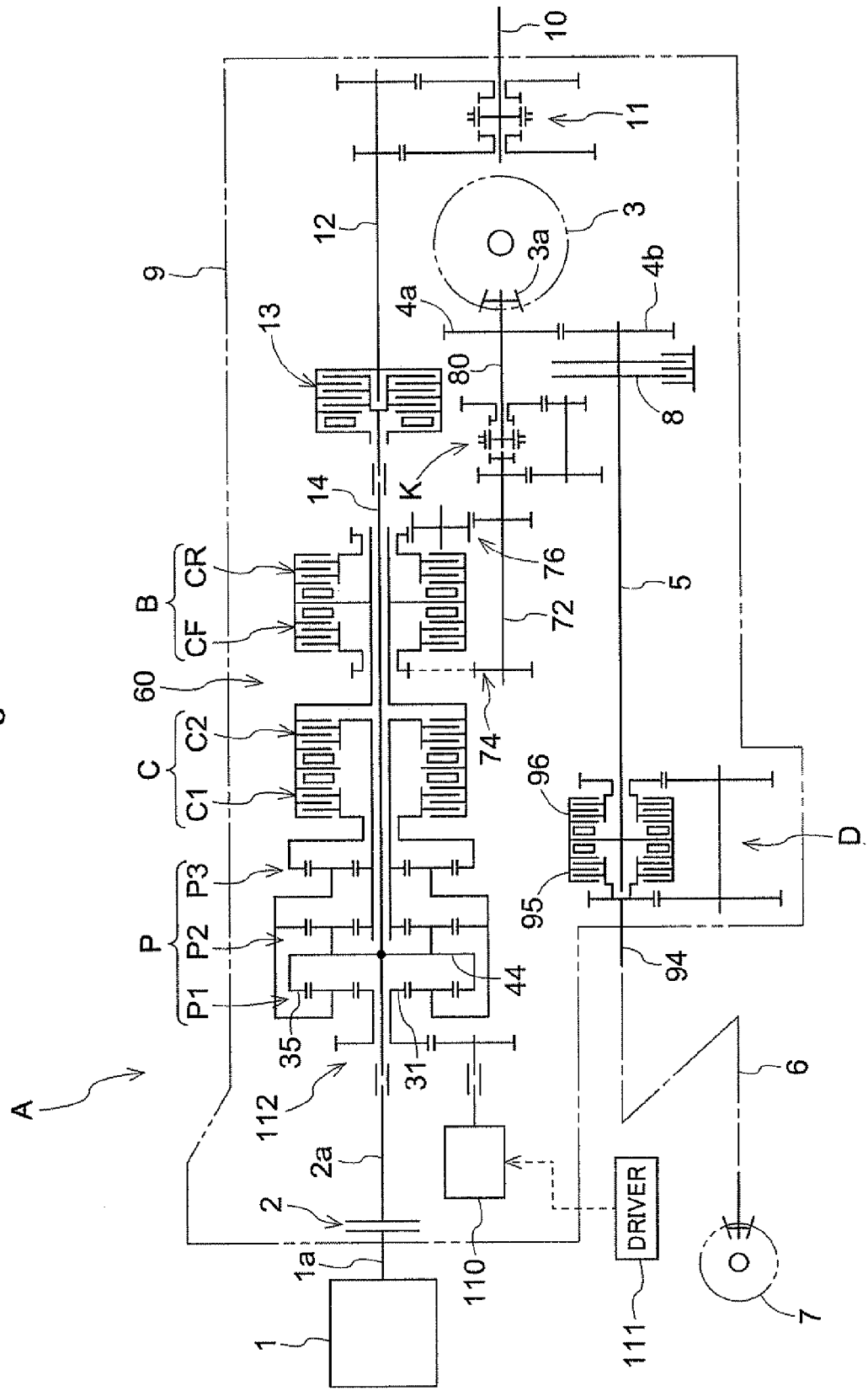
FIG. 8 is a line drawing of a tractor's travel transmission apparatus provided with a speed change transmission apparatus according to a second embodiment.

FIG. 8 is a line drawing of a tractor travel transmission apparatus provided with a speed change transmission apparatus A according to a second embodiment. Compared between the speed change transmission apparatuses A in the first and second embodiments, structures of the two are identical in terms of the planetary transmission device P, speed range setting device C, forward-reverse changeover device B and auxiliary speed change device K, but different in terms of inputting the variable and stepless drive. This difference will be described hereinafter.

The speed change transmission apparatus A in the second embodiment has an electric motor 110. The planetary transmission device P receives drive outputted from the electric motor 110 through the transmission gear mechanism 112 to the sun gear 31 of the first planetary transmission mechanism P1. The planetary transmission device P receives drive outputted from the output shaft a of the engine 1 through the main clutch 2 to the ring gear 35 of the first planetary transmission mechanism P1 and the carrier 44 of the second planetary transmission mechanism P2. The planetary transmission device P receives and combines the drive from the engine 1 and the drive from the electric motor 110, and transmits the combined drive to the speed range setting device C. The rotating speed of the electric motor 110 is changed steplessly by a driver 113 of the electric motor 110, and the speed range setting device C and auxiliary speed change device K are switched in conjunction with the speed change operation, so that the output speed of the output shaft 80 is changed steplessly to the first speed range in low speed mode or high speed mode, or to the second speed range in low speed mode or high speed mode in the same manner as the speed change transmission apparatus A in the first embodiment.

Figure 9:
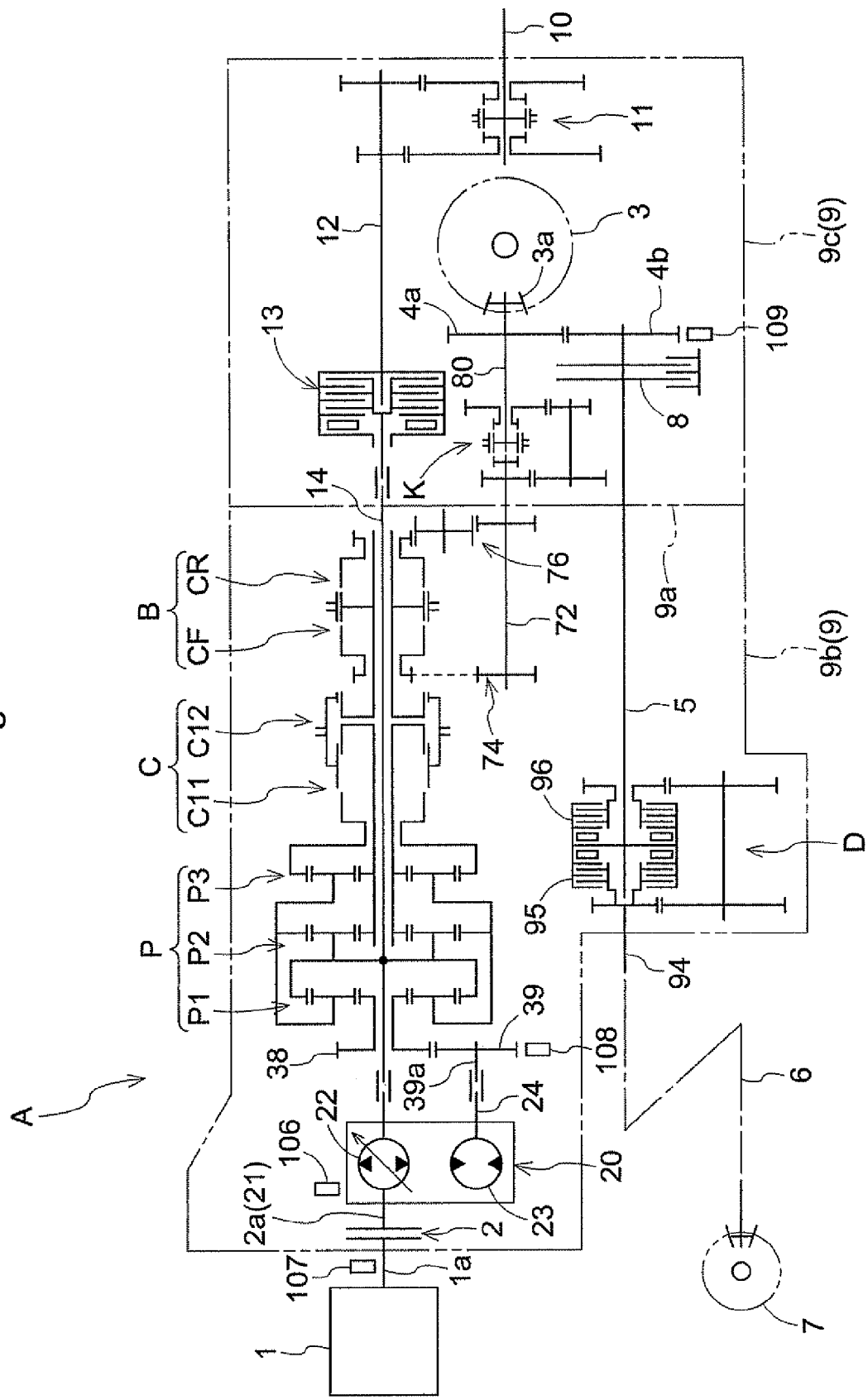
FIG. 9 is a line drawing of a tractor's travel transmission apparatus provided with a speed change transmission apparatus according to a third embodiment.

FIG. 9 is a line drawing of a tractor travel transmission apparatus provided with a speed change transmission apparatus A according to a third embodiment. Compared between the speed change transmission apparatuses A in the first and third embodiments, structures of the two are identical in terms of the stepless speed change device 20, planetary transmission device P and auxiliary speed change device K, but different in terms of the speed range setting device C and forward-reverse changeover device B. This difference will be described hereinafter.

Figure 10:
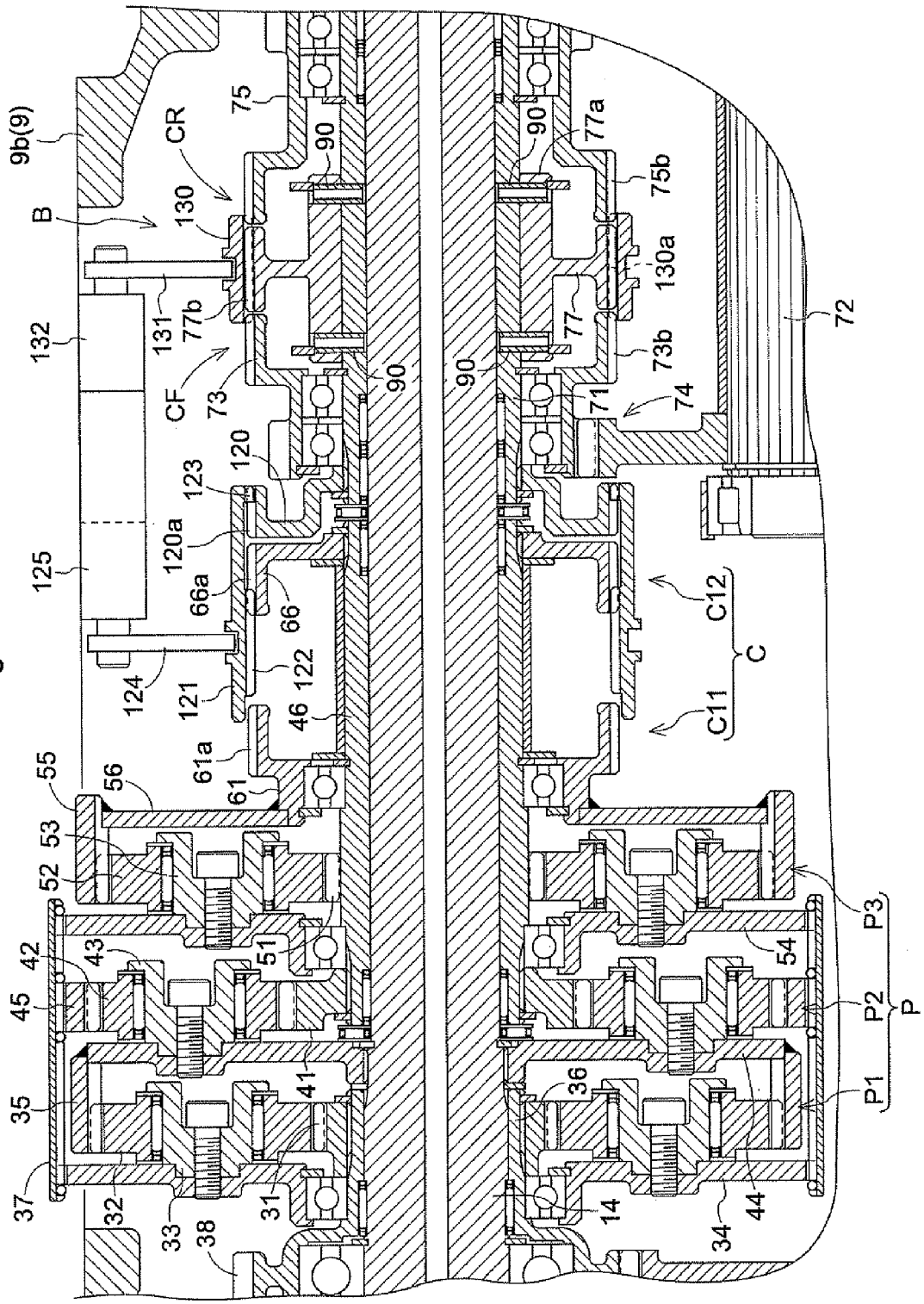
FIG. 10 is a cross sectional view of a forward-reverse changeover device and speed range setting device in the speed change transmission apparatus of the third embodiment.

FIG. 10 shows a cross section of the speed range setting device C in the speed change transmission apparatus A of the third embodiment. As illustrated, the first clutch 11 of the speed range setting device C in the speed change transmission apparatus A of the third embodiment includes a cylindrical input side member 61 interlocked by means of an interlocking member 56 to the ring gear 55, an output side member 120 integrally interlocked by spline engagement with the input cylinder shaft 71 of the forward-reverse changeover device B, and a cylindrical shift member 121 fitted along the output side member 120 and input side member 61.

The second clutch C12 in the speed range setting device C of the speed change transmission apparatus A in the third embodiment includes an input side member 66 integrally and rotatably interlinked by spline engagement with the cylinder shaft 46, an output side member 120 and a shift member 121. The shift member 121 of the second clutch C12 and the shift member 121 of the first clutch C11 are a shared shift member.

The shift member 121 includes an inner tooth-shaped output gear 123 and an inner tooth-shaped input gear 122 disposed on an inner periphery in a sliding direction of the shift member. A shift fork 124 engaged with an outer peripheral surface of the shift member 121 is moved by a hydraulic cylinder 125, so that the shift member 121 slides along the outer peripheral surface with the input side members 61, 66 and the output side member 120. Through the sliding action of the shift member 121, the input gear 122 is engaged with and disengaged from the outer tooth gear 61a provided on the outer peripheral surface of the input side member 61 and the outer tooth gear 66a provided on the outer peripheral surface of the input side member 66. When the shift member 121 slides in this manner, the output gear 123 slides toward the outer tooth gear 120a while staying meshed with the outer tooth gear 120a provided on the outer peripheral surface of the output side member 120.

The first clutch C11 and second clutch C12 comprise meshing clutches which are engaged when the shift member 121 is meshed with the input side members 61, 66 and the output side member 120, and disengaged when the shift member 121 is out of mesh with the input side members 61, 66.

Figure 11:
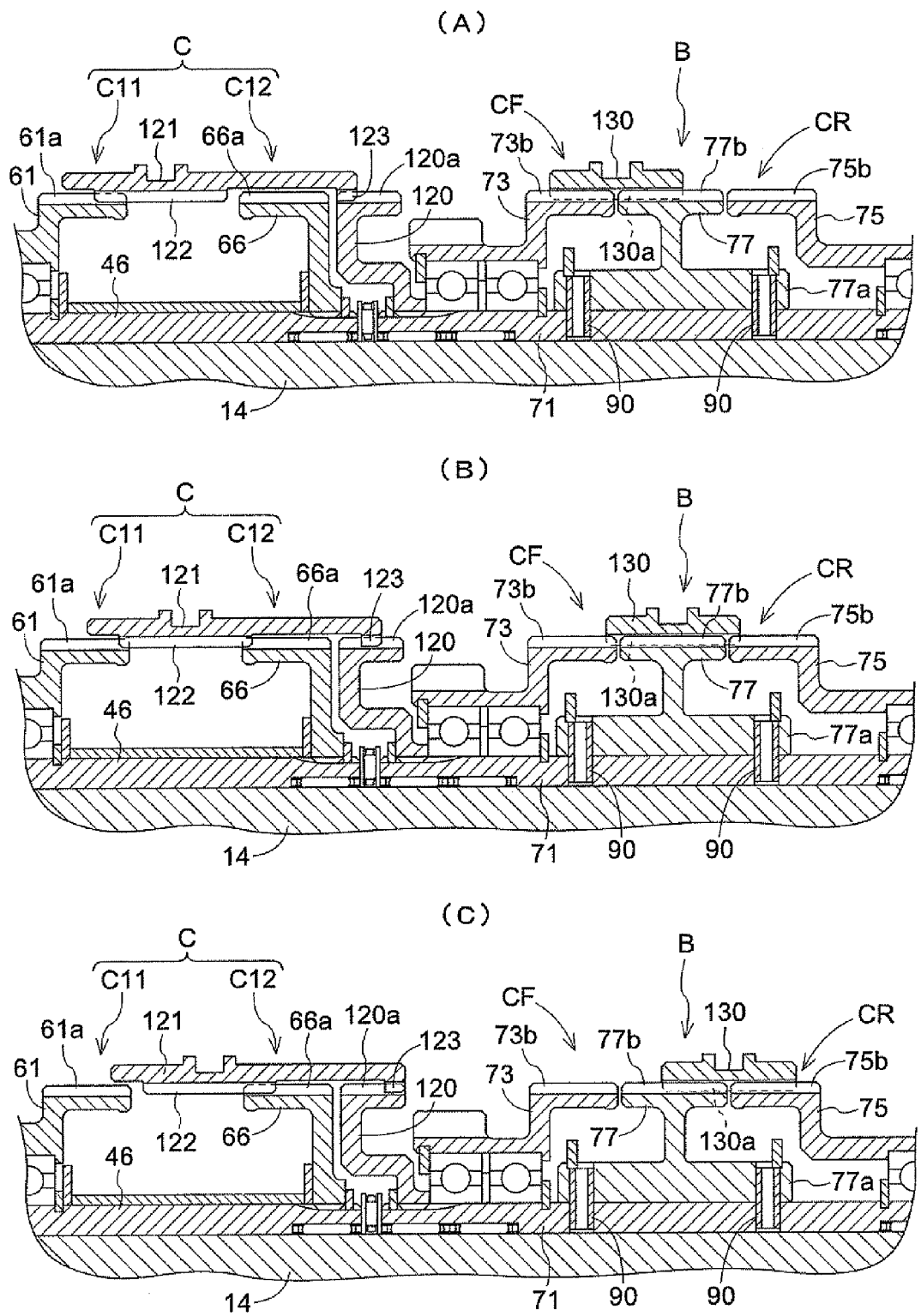
FIG. 11(A) is a cross sectional view of a speed range setting device set to a first speed range and a forward-reverse changeover device in a forward rotating transmission state.
FIG. 11(B) is a cross sectional view of the speed range setting device and forward-reverse changeover device in the midst of being switched.
FIG. 11(C) is a cross sectional view of the speed range setting device set to a second speed range and the forward-reverse changeover device in a reverse rotating transmission state.

FIG. 11(A) shows a cross section of the speed range setting device C set to the first speed range. As illustrated, the first clutch C11 is engaged and the second clutch C12 is disengaged when the shift member 121 slides and becomes meshed between the output side member 120 and the input side member 61 and the shift member 121 becomes out of mesh with the input side member 66. The speed range setting device C is thus set to the first speed range.

FIG. 11(C) shows a cross section of the speed range setting device C set to the second speed range setting. As illustrated, the first clutch C11 is disengaged and the second clutch C12 is engaged when the shift member 121 slides and becomes meshed between the output side member 120 and the input side member 66, and the shift member 121 becomes disengaged from the input side member 61. The speed range setting device C is thus set to the second speed range.

FIG. 11(B) shows a cross section of the speed range setting device C in the midst of being switched from one of the first speed range setting and second speed range setting to the other. As illustrated, the shift member 121 is meshed with both the first clutch C11 and second clutch C12 when the shift member 121 is moved to a position between the positions where the first clutch C11 is meshed and the second clutch C12 is not meshed, and the positions where the first clutch C11 is not meshed and the second clutch C12 is meshed.

That is, the speed range setting device C can be switched between the first speed range setting and second speed range setting while the rotating speeds of the input side member 61 and input side member 66 are the same. The shift member 121 thus switches the speed range setting device C from one of the first speed range setting or second speed range setting to the other while preventing both the first clutch C11 and second clutch C12 from becoming out of mesh with the shift member 121 and its resulting block of the transmission.

FIG. 10 is a cross section of the forward-reverse changeover device B provided in the speed change transmission apparatus A of the third embodiment. As illustrated, the forward clutch CF of the forward-reverse changeover device B in the speed change transmission apparatus A of the third embodiment includes an input side member 77 integrally and rotatably interlocked by a connection pin 90 with the cylinder shaft 71, an output side member 73 relatively rotatably supported by the cylinder shaft 71, and a shift member 130.

The reverse clutch CR of the forward-reverse changeover device B in the speed change transmission apparatus A of the third embodiment includes the input side member 77, output side member 75 relatively rotatably supported by the cylinder shaft 71, and the shift member 130. The shift member 130 of the reverse clutch CR and the shift member 130 of the forward clutch CF are a shared shift member.

The shift member 130 includes an inner tooth gear 130a provided on the inner periphery thereof. A shift fork 131 engaged with the outer peripheral surface of the shift member 130 is moved by a hydraulic cylinder 132, so that the shift member 130 slides along the outer peripheral surface with the input side member 77 and the output side members 73, 75. Through the sliding action of the shift member 130, the inner tooth gear 130a is engaged with and disengaged from the outer tooth gears 73b and 75b provided on the outer peripheral surface of the output side members 73, 75 and the outer tooth gear 77b provided on the outer peripheral surface of the input side member 77

The forward clutch CF and reverse clutch CR comprise meshing clutches which are engaged when the shift member 130 is meshed with the input side member 77 and the output side members 73, 75, and disengaged when the shift member 130 is out of mesh with the output side members 73, 75.

FIG. 11(A) shows a cross section of the forward-reverse changeover device B in the forward rotating transmission state. As illustrated, the forward clutch CF is engaged and the reverse clutch CR is disengaged when the shift member 130 slides and becomes meshed between the output side member 73 and the input side member 77 and when the shift member 130 becomes disengaged from the output side member 75. The forward-reverse changeover device B is thus in the forward rotating transmission state.

FIG. 11(C) shows a cross section of the forward-reverse changeover device B in the reverse rotating transmission state. As illustrated, the forward clutch CF is disengaged and the reverse clutch CR is engaged when the shift member 130 slides and becomes meshed between the output side member 75 and the input side member 77 and when the shift member 130 becomes disengaged from the output side member 73. The forward-reverse changeover device B is thus in the reverse rotating transmission state.

FIG. 11(B) shows a cross section of the forward-reverse changeover device B in the midst of being switched from one of the forward rotating transmission state and reverse rotating transmission state to the other. As illustrated, the forward clutch CF and reverse clutch CR are both meshed with the shift member 130, when the shift member 130 is moved to a position between the positions where the forward clutch CF is meshed and the reverse clutch CR is not meshed, and the positions where the forward clutch CF is not meshed and the reverse clutch CR is meshed.

That is, the forward-reverse changeover device B can be switched between the forward rotating transmission state and reverse rotating transmission state while the rotating speed of the forward-reverse changeover device B is zero as a result of the shift speed control of the stepless speed change device 20. The shift member 130 thus switches the forward-reverse changeover device B from either one of the forward rotating transmission state and the reverse rotating transmission state to the other, through the position where the forward clutch CF and reverse clutch CR are both meshed with the shift member 130. This means that the shift member 130 does not have a position disengaged from both of the output members 73, 75, which reduces an operating stroke of the shift member 130. It is thereby possible to more rapidly shift the shift member 130 to switch the forward-reverse changeover device B from either one of the forward rotating transmission state and reverse rotating transmission state to the other.

Figure 12:
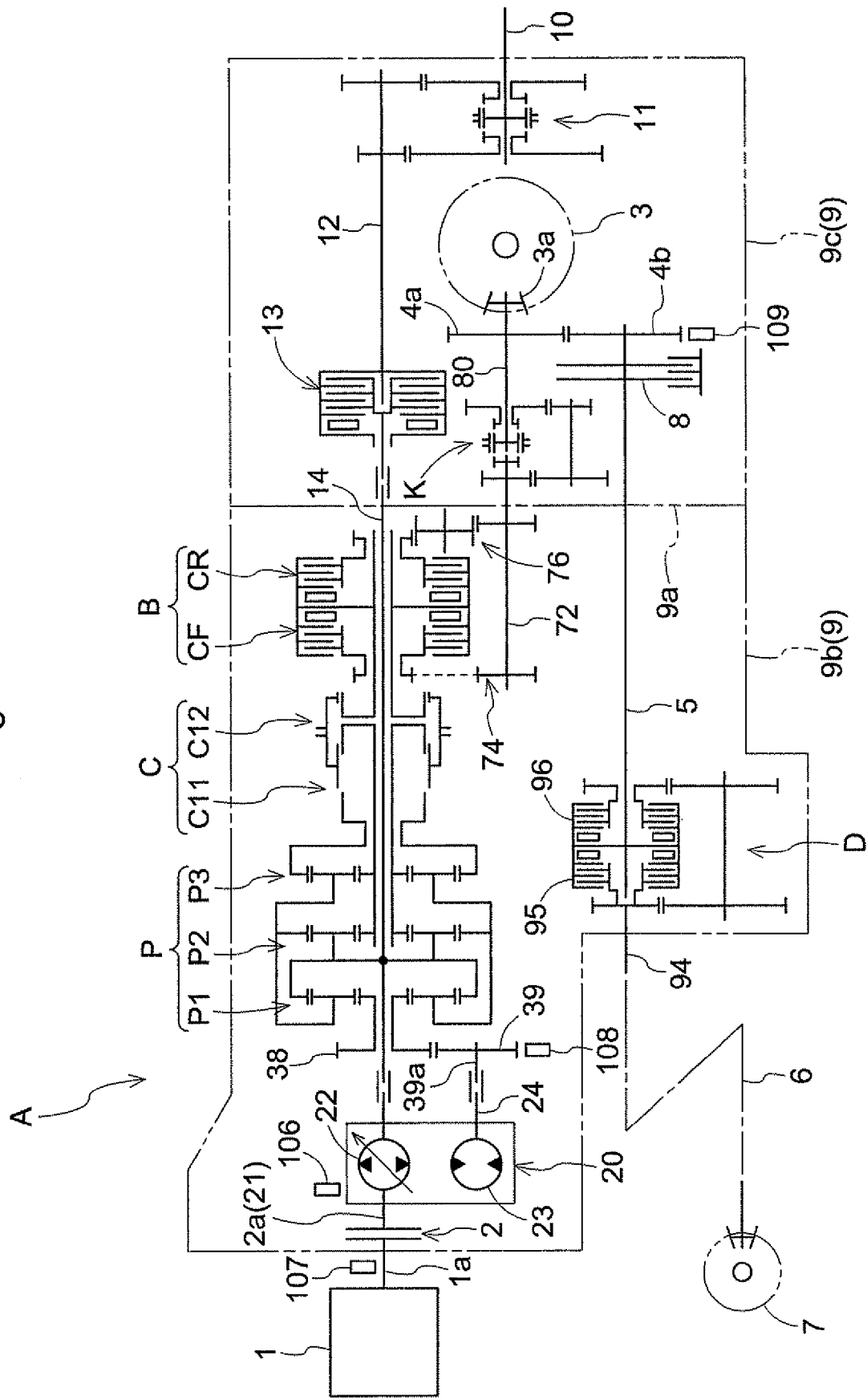
FIG. 12 is a line drawing of a tractor's travel transmission apparatus provided with a speed change transmission apparatus according to a fourth embodiment.

FIG. 12 is a line drawing of a tractor travel transmission apparatus provided with a speed change transmission apparatus A according to a fourth embodiment. Compared between the speed change transmission apparatuses A in the first and fourth embodiments, structures of the two are identical in terms of the stepless speed change device 20, planetary transmission device P, forward-reverse changeover device B and auxiliary speed change device K, but different in terms of the speed range setting device C. This difference will be described hereinafter.

The speed range setting device C of the speed change transmission apparatus A in the fourth embodiment includes a first clutch C11 and second clutch 12 having the same structure as the first clutch C11 and second clutch C12 provided in the speed range setting device C of the speed change transmission apparatus A of the third embodiment.

OTHER EMBODIMENTS

Figure 13:
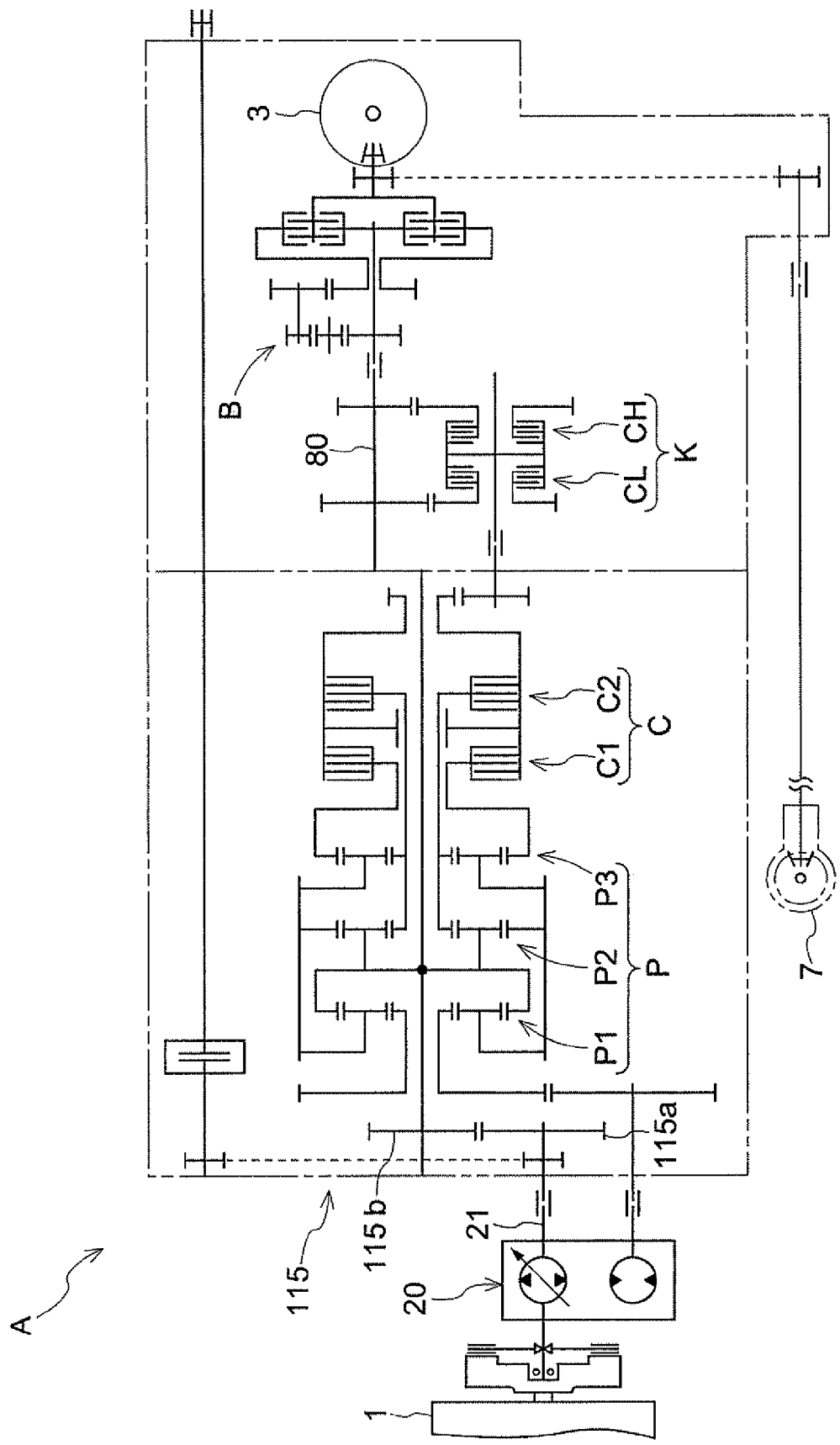
FIG. 13 is a line drawing of a tractor's travel transmission apparatus provided with a previously developed speed change transmission apparatus.
Figure 14:
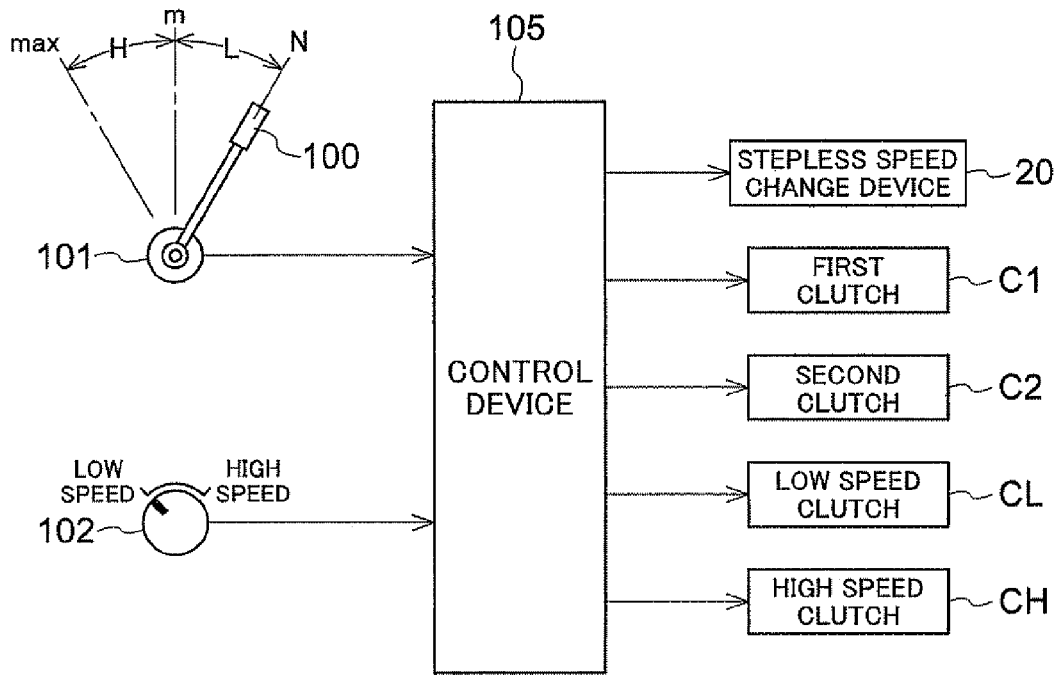
FIG. 14 is a block diagram of the speed change apparatus of the previously developed speed change transmission apparatus.
Figure 15:
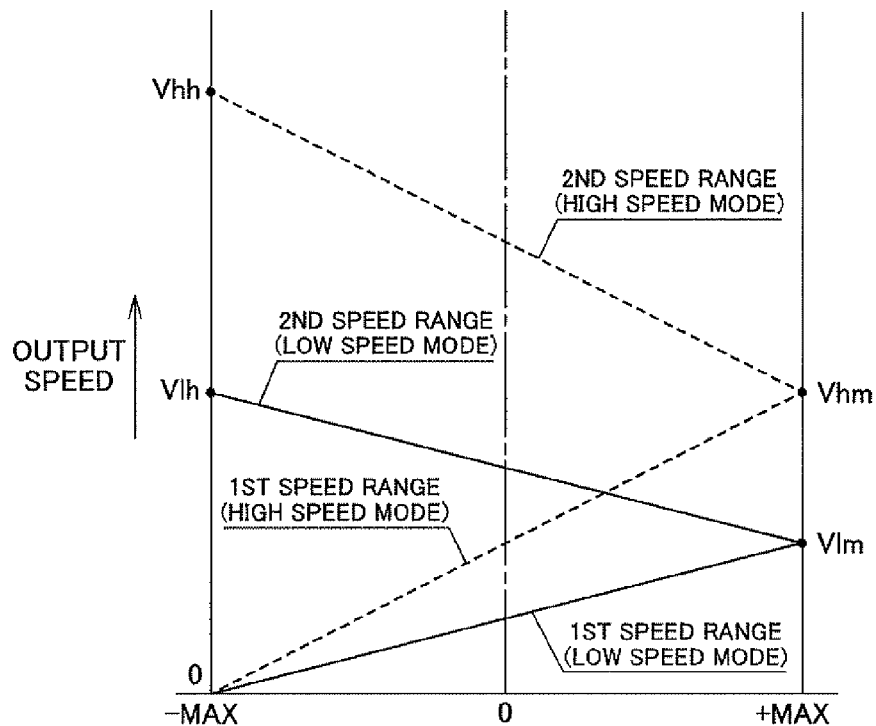
FIG. 15 illustrates a diagram showing a relationship between a speed change state of a stepless speed change device, a speed range, a speed mode and an output speed in the previously developed speed change transmission apparatus.

In the foregoing embodiments, even though the speed change lever 100 is in the maximum speed position max, the stepless speed change device 20 is not shifted to "−MAX" but is controlled so as to stay at "−VH," which is lower than "−MAX". Alternatively, the stepless speed change device 20 may be shifted to "−MAX" when the speed change lever 100 reaches the maximum speed position max. In this case, the output speed reaches "Vlh" in low speed mode, and the output speed reaches "Vhh" in high speed mode. In this case, the engine drive may be inputted by way of a speed-reducing mechanism 115 to the ring gear of the first planetary transmission mechanism P1, as illustrated in FIG. 13, so as to reduce the speed of the planetary transmission device. The speed-reducing mechanism 115 includes a gear 115a interlocked with the pump shaft 21 of the stepless speed change device 20, and a gear 115b meshed with the gear 115a.

The objects of the invention can be fulfilled even with the use of a speed shift pedal or speed shift switch instead of the speed change lever 100. As such, the speed change lever 100, speed shift pedal, speed shift switch and the like are collectively referred to as a speed change member or a speed change device 100.

The speed change transmission apparatus in the embodiments of the invention can be used as a speed change apparatus in work vehicles such as tractors.

The invention claimed is:

1. A speed change transmission apparatus comprising:
an electric motor or a stepless speed change device for receiving an engine drive;
a planetary transmission device for, by a plurality of planetary transmission mechanisms, combining an output from the stepless speed change device and the engine drive not subject to a speed change by the stepless speed change device, or combining an output from the electric motor and the engine drive;
a speed range setting device for receiving the drive combined by the planetary transmission device and producing a first speed range and a second speed range, the speed range setting device including a first clutch and a second clutch;
a forward-reverse changeover device for switching a direction of the output from the speed range setting device;
an upstream transmission case portion, the upstream transmission case portion having a rear end;
a downstream transmission case portion housing at least a rear wheel differential mechanism, the downstream transmission case portion having a front end to be directly connected with the rear end of the upstream transmission case portion; and
an auxiliary speed change device housed in the downstream transmission case portion for receiving an output from the forward-reverse changeover device,
wherein the auxiliary speed change device is located downstream of the forward-reverse changeover device in a drive transmitting direction, the auxiliary speed change device extending between a rear end of an output shaft for outputting a drive from the upstream transmission case portion and a front end of an output rotator for inputting the drive from the upstream transmission case portion to the downstream transmission case portion;
wherein a transmission case dividing line extends between the upstream transmission case portion and the downstream transmission case portion to define thereat a bonding face of each of the upstream transmission case portion and the downstream transmission case portion;
wherein the forward-reverse changeover device includes a forward-reverse changeover clutch; and
wherein the plurality of planetary transmission mechanisms has respective sun gears thereof coaxially mounted on a pivot shaft which pivot shaft also mounts thereon a rotating member of each of the first and second clutches of the speed range setting device and a rotating member of the forward-reverse changeover clutch of the forward-reverse changeover device; the planetary transmission device, the speed range setting device and the forward-reverse changeover device being disposed in the stated sequence from the upstream transmission case portion in an axial direction of the pivot shaft.

2. The speed change transmission apparatus according to claim 1, wherein
the first and second clutches of the speed range setting device are hydraulic clutches, and
the forward-reverse changeover clutch of the forward-reverse changeover device is a hydraulic clutch.

3. The speed change transmission apparatus according to claim 1, wherein
the first and second clutches of the speed range setting device are meshing clutches, the speed range setting device further including a shift member shared by the first and second clutches, and
the shift member has a position thereof in mesh with both the first and second clutches disposed between a position thereof in mesh with only one of the first and second clutches and a position thereof in mesh with only the other of the first and second clutches.

4. The speed change transmission apparatus according to claim 1, further comprising:
a manually operable speed change member;
a speed change command detection sensor for detecting a speed change command from the speed change member; and
a controller for changing speed of the electric motor or the stepless speed change device and switching the speed range setting device based on data detected by the speed change command detection sensor so that the output rotator is driven in a speed range and at a rotating speed according to the speed change command from the speed change member for outputting drive after the speed change by the speed change transmission apparatus,
wherein the controller is constructed in such a way that:
when the speed range setting device is operated to drive the output rotator at the first speed range, the speed of the electric motor or the stepless speed change device is changed along the entire speed change area on the reverse rotation output side thereof and along the entire speed change area on the forward rotation output side thereof; and
when the speed range setting device is operated to drive the output rotator at the second speed range, the speed of the electric motor or the stepless speed change device is changed along the entire speed change area on the forward rotation output side thereof, and along a lower side speed change area on the reverse rotation output side thereof excluding a higher side speed change area on the reverse rotation output side thereof.

5. The speed change transmission apparatus according to claim 4, wherein the planetary transmission device receives the engine drive in a non-reduced speed state.

* * * * *